US012387892B2

(12) United States Patent
Jackson et al.

(10) Patent No.: US 12,387,892 B2
(45) Date of Patent: Aug. 12, 2025

(54) LOAD SWITCHING SYSTEM AND CIRCUIT

(71) Applicant: SiliconBrite Technologies, Inc., Santa Clara, CA (US)

(72) Inventors: Cameron Nathan Jackson, Los Gatos, CA (US); Baris Karagozlu, Dublin, CA (US)

(73) Assignee: SiliconBrite Technologies, Inc., Santa Clara, CA (US)

( * ) Notice: Subject to any disclaimer, the term of this patent is extended or adjusted under 35 U.S.C. 154(b) by 147 days.

(21) Appl. No.: 18/372,653

(22) Filed: Sep. 25, 2023

(65) Prior Publication Data

US 2025/0104947 A1 Mar. 27, 2025

(51) Int. Cl.

| | |
|---|---|
| ***H02H 3/00*** | (2006.01) |
| ***H01H 47/00*** | (2006.01) |
| ***H01H 47/18*** | (2006.01) |
| ***H01H 47/32*** | (2006.01) |
| *H01H 47/02* | (2006.01) |

(52) U.S. Cl.

CPC ........ *H01H 47/001* (2013.01); *H01H 47/002* (2013.01); *H01H 47/18* (2013.01); *H01H 47/32* (2013.01); *H01H 2047/025* (2013.01)

(58) Field of Classification Search

None

See application file for complete search history.

(56) References Cited

U.S. PATENT DOCUMENTS

| | | | | |
|---|---|---|---|---|
| 9,537,316 | B2 * | 1/2017 | Ailenei | H02J 3/0073 |
| 11,495,956 | B1 * | 11/2022 | Marzano | H01H 83/20 |
| 11,935,719 | B2 * | 3/2024 | Jackson | H01H 47/18 |
| 2022/0328273 | A1 * | 10/2022 | Vaghasiya | H02J 13/00004 |

* cited by examiner

*Primary Examiner* — Stephen W Jackson

(74) *Attorney, Agent, or Firm* — André Grouwstra

(57) ABSTRACT

A load switching circuit includes a supply power availability (SPA) detector, a rail voltage detector, a swell detector, a surge detector, control logic, make and break timers, and a relay driver. The detectors detect various conditions, and generate signals in response to some detected conditions. The control logic is configured to: (1) release a relay within 300 ms after receiving a power-up signal; (2) start the make timer upon receiving a "rail voltage present" signal and wait for a first delay time, then operate the relay; (3) start the break timer upon receiving a "swell detected" signal to wait for a second delay time, then release the relay; (4) cause a shunt switch to conduct within 10 ms after receiving a "surge detected" signal; and (5) release the relay within 10 ms after receiving a "rail fail" signal.

24 Claims, 15 Drawing Sheets

LOAD SWITCHING SYSTEM AND CIRCUIT

BACKGROUND

Technical Field

The disclosed implementations relate generally to systems and methods used in power supply protection systems, and in particular to those for switching large voltages and currents with high efficiency.

Context

When high-power loads must be switched on or off with high efficiency, solid-state (semiconductor) switches cannot always be used because they dissipate too much power. Electromechanical relays can have a much lower on-resistance than solid-state switches and dissipate much less. However, their lifetime may be shortened significantly when higher amounts of power are switched. For this reason, high-power switches often use expensive relays.

The problems in relays include bouncing when a relay is switched on, and arcing due to parasitic inductance when large currents are switched off. When contacts are nearly closed but at strongly different voltage levels, arcing may decompose organic matter contained in the air, and cause deposits such as oxides and carbides to develop on the contacts. Additionally, melting may occur, causing welding of the contacts, or transfer of contact material that results in uneven surfaces that may eventually lock mechanically. Bouncing exacerbates the problems by repeatedly making and breaking before a steady state is reached. The number of bounces the contacts make before reaching a steady state may significantly count towards the end of the relay's life. Relays may also suffer from overheating of the coil. High coil temperatures further reduce the lifetime of the contacts and can also result in burnout of the coil itself.

Latching relays are bistable and switch between two states when driven. They may be set and reset with a constant signal or with a pulse. Some latching relays include a single coil requiring the drive polarity to be reversed between operation (the make action) and release (the break action). Other latching relays include a single coil with a center tap. Those latching relays require a signal on one coil end for operation and on the other coil end for release. Yet other latching relays have separate coils and may be driven a similar way as latching relays with a center tap. Because latching relays may be switched with just a pulse, coil overheating can be much less of a problem.

Subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

SUMMARY

In some aspects, the techniques described herein relate to a load switching circuit, including: a supply power terminal and a common terminal; a supply power availability detector (a SPA detector) coupled with the supply power terminal and configured to detect availability of supply power at the supply power terminal within sixty (60) milliseconds; a rail voltage detector with a rail voltage detector input terminal; a swell detector with a swell detector input terminal; a surge detector with a surge detector input terminal; control logic with inputs coupled with the SPA detector, the rail voltage detector, the swell detector, and the surge detector; a make timer with an input coupled with the control logic; a break timer with an input coupled with the control logic; a relay driver with an input coupled with the make timer and an input coupled with the break timer; a shunt switch control terminal coupled with the control logic; and one or more coil control terminals coupled with the relay driver; wherein the control logic is configured to: cause the relay driver to provide a second coil control output signal on the one or more coil control terminals within three hundred (300) milliseconds after receiving a power-up signal from the SPA detector; start the make timer upon receiving a "rail voltage present" signal and wait for a first delay time, then cause the relay driver to provide a first coil control output signal on the one or more coil control terminals; start the break timer upon receiving a "swell detected" signal from the swell detector to wait for a second delay time, then cause the relay driver to provide the second coil control output signal on the one or more coil control terminals; provide a shunt switch control signal on the shunt switch control terminal upon receiving a "surge detected" signal from the surge detector; and provide the second coil control output signal on the one or more coil control terminals within ten (10) milliseconds after receiving a "rail fail" signal from the rail voltage detector.

In some aspects, the techniques described herein relate to a load switching system, including: power lines including a first rail and a second rail; a relay with relay contacts in series with the first rail, and with two or more relay control terminals; a first load terminal coupled with a relay contact and a second load terminal coupled with the second rail; a shunt switch coupled between the first load terminal and the second load terminal; a power supply circuit coupled between the first rail and the second rail, with a supply power output; and a load switching circuit coupled with the power lines, the relay, the shunt switch, and the power supply circuit; wherein the load switching circuit is configured to: detect availability of supply power from the power supply circuit; cause the relay to release within three hundred (300) milliseconds after detecting the availability of the supply power; detect a presence of a rail voltage; upon detecting the presence of the rail voltage, wait for a first delay time, then cause the relay to operate; detect a presence of a swell; upon detecting the presence of the swell, wait for a second delay time, then cause the relay to release; detect a presence of a surge; and upon detecting the presence of the surge, cause the shunt switch to conduct.

A further understanding of the nature and the advantages of particular implementations disclosed herein may be realized by reference of the remaining portions of the specification and the attached drawings.

BRIEF DESCRIPTION OF THE DRAWINGS

The technology will be described with reference to the drawings, in which.

Figure 1:
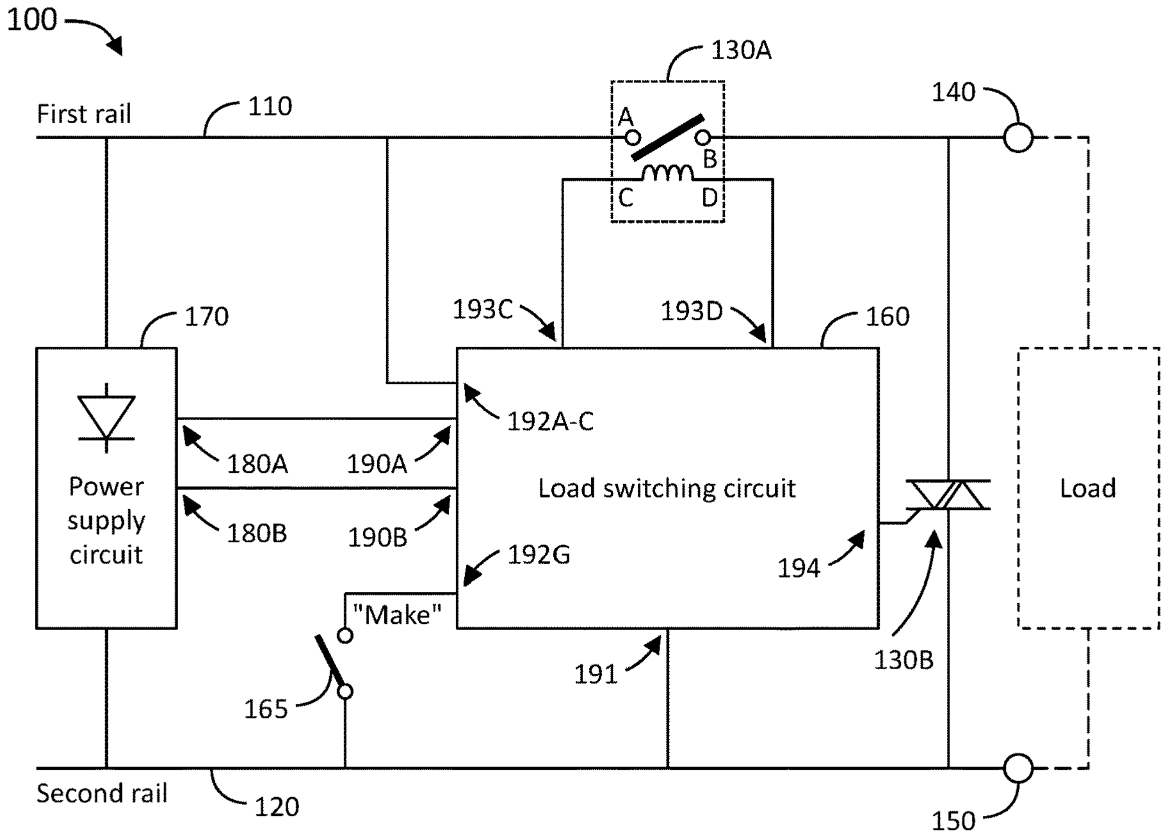
FIG. 1 illustrates an example load switching system that provides swell and surge protection.

In the figures, like reference numbers may indicate functionally similar elements. The systems and methods illustrated in the figures—and described in the Detailed Description below—may be arranged and designed in a wide variety of different implementations. Neither the figures nor the Detailed Description are intended to limit the scope as claimed. Instead, they merely represent examples of different implementations.

DETAILED DESCRIPTION

A load switching system couples an electric load, such as an appliance, a motor, or electronic equipment, with power rails such as for 110 or 220 V mains power, as long as the mains power is suitable for use and decouples the electric load when the mains power is outside of safe limits, or when the load is failing such as in the case of a short circuit. The load switching system protects the load against swells (slow changes taking the mains voltage outside of its safe limits) and surges (fast spikes outside the limits), and may further provide protection against overcurrent situations, such as in the case of a short circuit.

Using a relay, especially a latching relay, offers several potential benefits for swell protection. But it brings its own challenges, such as the relay's declining reliability over time due to switching high power. The technology disclosed herein overcomes those swell protection challenges by carefully timing relay make and break times, for example by modifying the make and break times dependent on the temperature. Implementations reduce bounce and arcing by accelerating relay make and break times by providing the relay coil more power over a shorter time.

Relays are too slow for surge protection, so implementations provide an additional fast protection mechanism. Traditionally, surge protection is done passively, with varistors, but varistors tend to burn out, potentially leaving the system inoperable or unreliable after a surge. This document discloses a technique for active surge protection, using a TRIAC or other fast switch to protect the load when a surge occurs, and restore the flow of energy when the surge is over. Implementations combine the use of relays for swell protection with active surge protection. Additionally, they may provide a circuit for relay status error detection, allowing the system or a user to take action when the relay does not operate as intended.

Terminology

As used herein, the phrase one of should be interpreted to mean exactly one of the listed items. For example, the phrase one of A, B, and C should be interpreted to mean any of: only A, only B, or only C.

As used herein, the phrases at least one of and one or more of should be interpreted to mean one or more items. For example, the phrase at least one of A, B, and C or the phrase at least one of A, B, or C should be interpreted to mean any combination of A, B, and/or C.

Unless otherwise specified, the use of ordinal adjectives first, second, third, etc., to describe an object, merely refers to different instances or classes of the object and does not imply any ranking or sequence.

The term coupled is used in an operational sense and is not limited to a direct or an indirect coupling. Coupled to is generally used in the sense of directly coupled, whereas coupled with is generally used in the sense of directly or indirectly coupled. Coupled in an electronic system may refer to a configuration that allows a flow of information, signals, data, or physical quantities such as electrons between two elements coupled to or coupled with each other. In some cases, the flow may be unidirectional, in other cases the flow may be bidirectional or multidirectional. Coupling may be galvanic (in this context meaning that a direct electrical connection exists), capacitive, inductive, electromagnetic, optical, or through any other process allowed by physics.

The term connected is used to indicate a direct connection, such as electrical, optical, electromagnetic, or mechanical, between the things that are connected, without any intervening things or devices.

The term configured to perform a task or tasks is a broad recitation of structure generally meaning having circuitry that performs the task or tasks during operation. As such, the described item can be configured to perform the task even when the unit/circuit/component is not currently on or active. In general, the circuitry that forms the structure corresponding to configured to may include hardware circuits, and may further be controlled by switches, fuses, bond wires, metal masks, firmware, and/or software. Similarly, various items may be described as performing a task or tasks, for convenience in the description. Such descriptions should be interpreted as including the phrase configured to.

As used herein, the term based on is used to describe one or more factors that affect a determination. This term does not foreclose the possibility that additional factors may affect the determination. That is, a determination may be solely based on specified factors or based on the specified factors as well as other, unspecified factors. Consider the phrase determine A based on B. This phrase specifies that B is a factor that is used to determine A or that affects the determination of A. This phrase does not foreclose that the determination of A may also be based on some other factor, such as C. This phrase is also intended to cover an implementation in which A is determined based solely on B. The phrase based on is thus synonymous with the phrase based at least in part on.

The terms substantially, close, approximately, near, and about refer to being within minus or plus 10% of an indicated value, unless explicitly specified otherwise.

The following terms or acronyms used herein are defined at least in part as follows:

AC—alternating current—an electric current that reverses its direction regularly or irregularly.

Assert—to set a signal or a bit line in a state that is equivalent to a Boolean value of "true" or "active", or to cause a relay or switch to close.

Break—the action of resetting the relay (also called release). See also: make.

DC—direct current—an electric current that flows in only one direction.

De-assert—to set a signal or a bit line in a state that is equivalent to a Boolean value of "false" or "inactive", or to cause a relay or switch to open.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

Latching relay—a bistable relay, that may be driven with a constant drive signal or just a short pulse to connect or disconnect. Latching relays may have two separate coils (one for make and one for break), a single coil with center tap, or just a single coil. In contrast with common usage, in implementations described in this document it is assumed that a latching relay is always driven with a pulse.

Load switching circuit—an electronic circuit configured to couple an electric load, such as an appliance, a motor, or electronic equipment, with power rails such as for 110 or 220V mains power, as long as the mains power is suitable for use and to decouple the electric load when the mains power is outside of safe limits, or when the load is failing such as in the case of a short circuit.

Make—the action of setting the relay (also called operation). See also: break.

Monovibrator—a mono-stable multivibrator, or one-shut pulse generator.

Operation time—The time between applying power to a relay's coil and the establishment of an electrical connection between the contacts, due to the contacts traveling from the steady-state break position to the steady-state make position.

PCB—printed circuit board.

Release time—the time between signaling a relay to disconnect and the end of the electrical connection between the contacts, due to the contacts traveling away from the steady-state make position.

SPA detector—a supply power availability detection circuit. See the description of FIG. 8.

TRIAC—a "triode for alternating current"—a three-terminal electronic device that conducts current in either direction when triggered.

Implementations

FIG. 1 illustrates an example load switching system 100 that provides swell and surge protection. Load switching system 100 includes power lines including a first rail 110 and a second rail 120; a first load terminal 140 coupled with first rail 110 and a second load terminal 150 coupled with second rail 120; a series switch 130A (a relay) that has relay contacts (A and B) coupled between first rail 110 and first load terminal 140 and with two or more relay control terminals (C and D); a shunt switch 130B (for example, a TRIAC or other high-speed switching device) coupled between first load terminal 140 and second load terminal 150; a power supply circuit 170 coupled between first rail 110 and second rail 120, with one or more supply power output(s) 180A-B; and a load switching circuit 160. A switch 165 may be coupled with load switching circuit 160 to provide a "Make" or "Must make" signal to cause series switch 130A to couple the load with the power lines.

Load switching circuit 160 has various terminals, including one or more supply power input terminal(s) 190A/B; a common terminal 191; one or more power line sense input terminal(s) 192A-C; a "must make" input terminal(s) 192H; one or more coil control terminal(s) 193C-D; and a shunt switch control terminal 194. Load switching system 100 is configured to be coupled with a load at first load terminal 140 and second load terminal 150.

In case the power lines supply an AC voltage, first rail 110 may be a line rail and second rail 120 may be a neutral rail. In case the power lines supply a DC voltage, first rail 110 may be at a higher voltage than second rail 120.

In the implementation of FIG. 1, input terminal(s) 192 is coupled with first rail 110 and common terminal 191 is coupled with second rail 120. Load switching circuit 160 receives power from power supply circuit 170, which receives and rectifies supply current from first rail 110 and supplies the supply current to load switching circuit 160 via one or more supply power output(s) 180A-B to supply power input terminal(s) 190A-B. In this example, two supply power terminals have been drawn. One may deliver a supply voltage for the internal operation of load switching circuit 160, whereas the other may deliver a supply voltage suitable to drive the relay coil via coil control terminal(s) 193C-D. Load switching circuit 160 returns its supply current via common terminal 191 into second rail 120.

In the implementation of FIG. 1, series switch 130A is a latching relay. A latching relay can be set or reset by applying a pulse to a coil. For example, a positive coil voltage pulse may be applied to set the latching relay and a negative coil voltage pulse may be applied to reset the latching relay. However, in another implementation, series switch 130A is not a latching relay and it may be set by continuously applying a coil voltage and reset by not applying any coil voltage. In general, load switching system 100 resets series switch 130A by applying a second coil control output signal on the one or more coil control terminals (e.g., coil control terminal(s) 193C-D), and sets series switch 130A by applying a first coil control output signal on the one or more coil control terminals (e.g., coil control terminal(s) 193).

Figure 5:
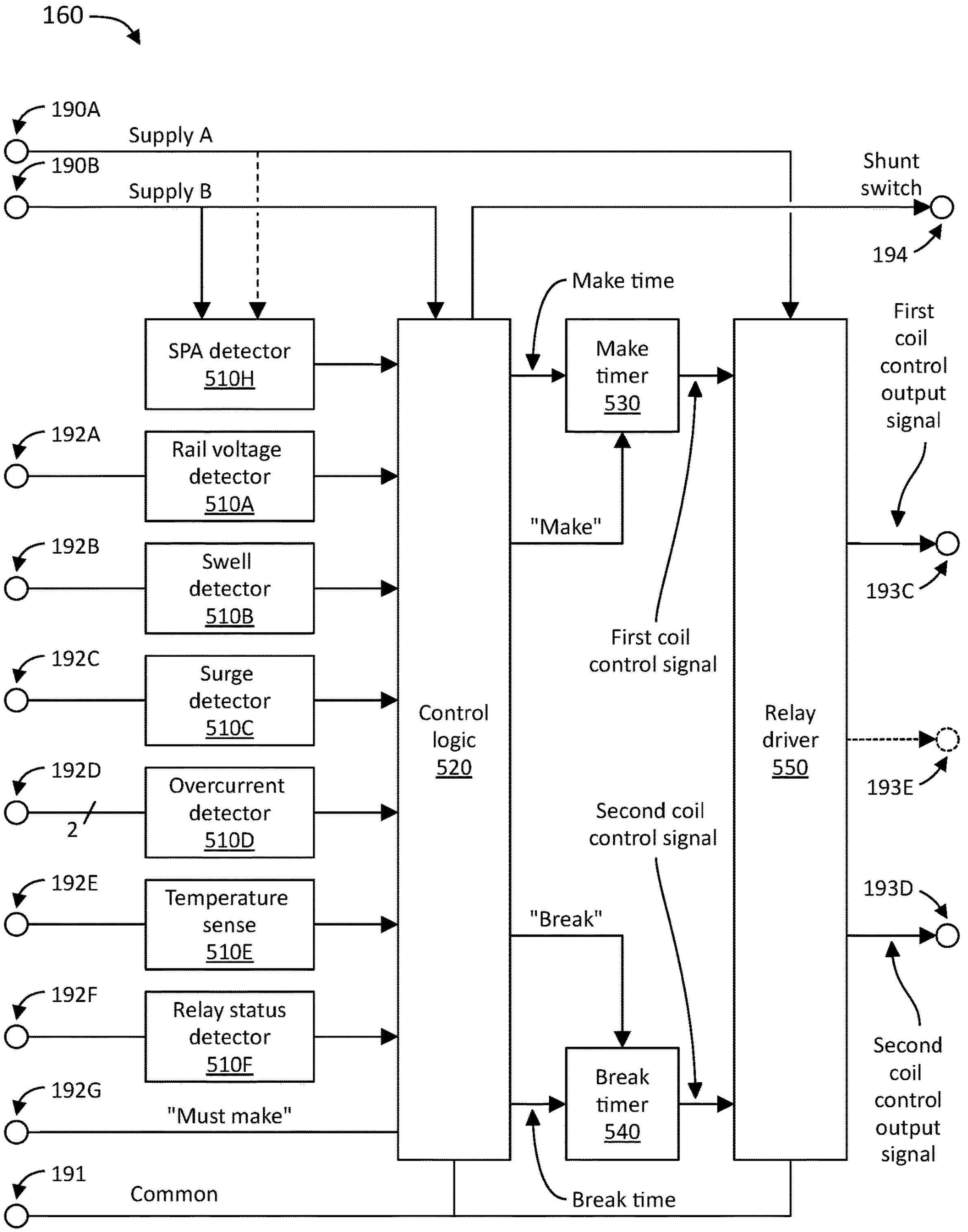
FIG. 5 illustrates an example load switching circuit as may be used in the load switching systems of FIGS. 1-4.
Figure 6A:
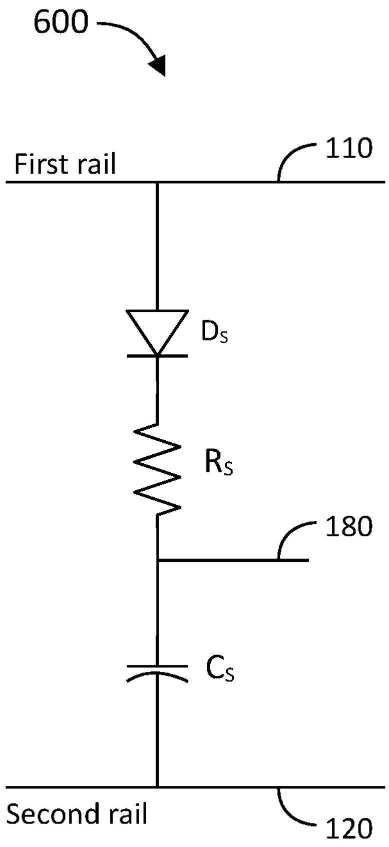
FIGS. 6A-B illustrate examples of a power supply circuit.
Figure 6B:
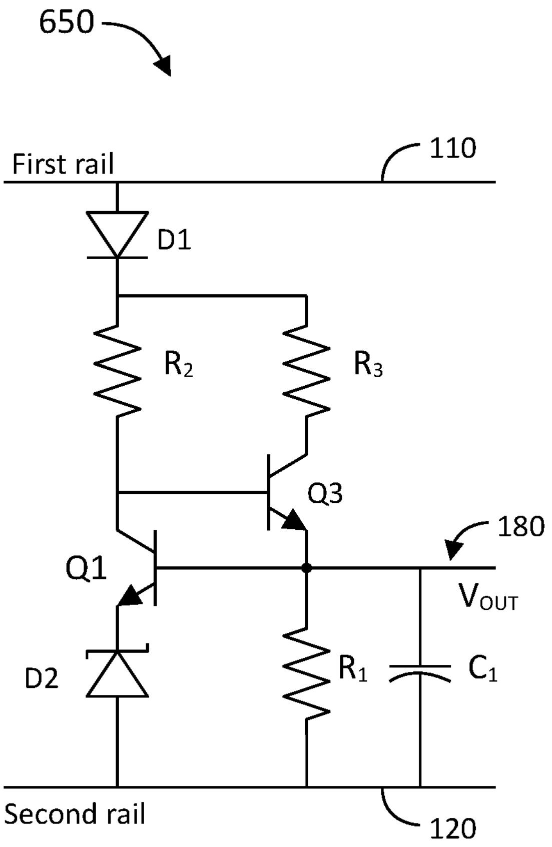
Figure 7A:
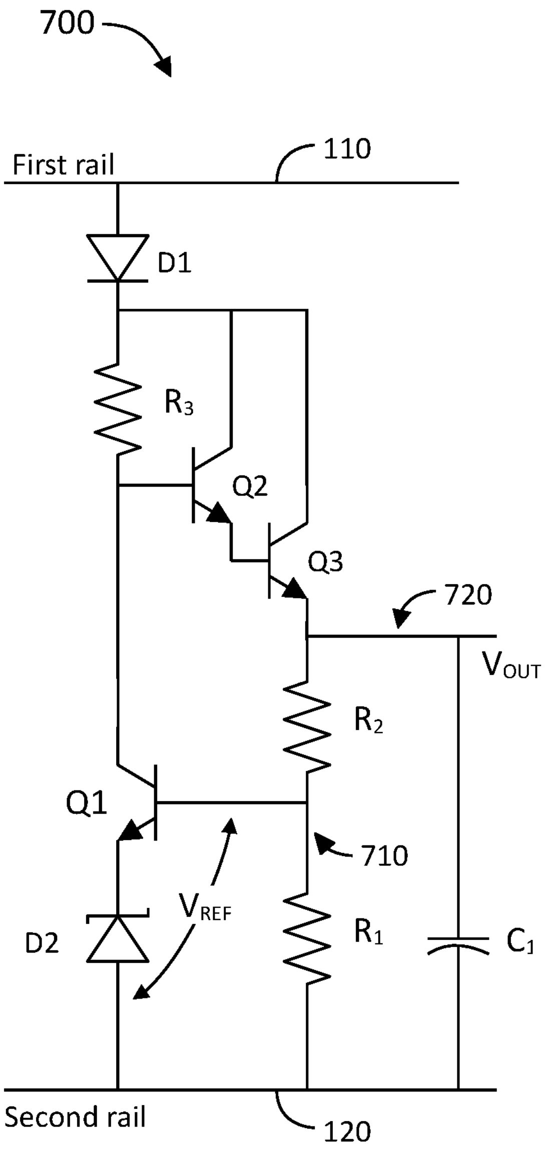
FIGS. 7A-B illustrate another example power supply circuit and an example variation.
Figure 7B:
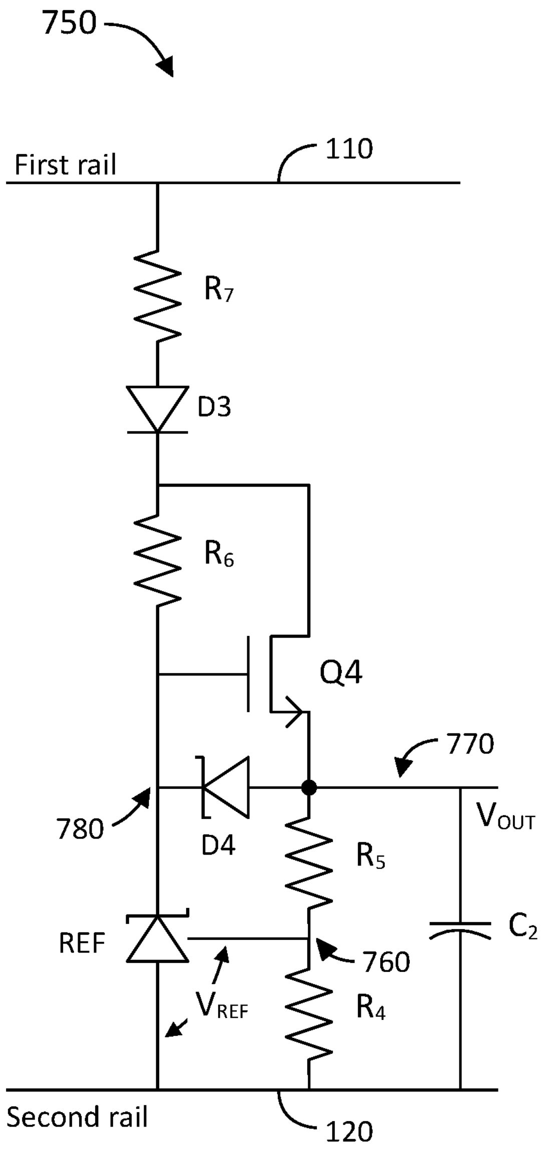

Example details about the makeup and functionality of load switching circuit 160 are provided with reference to FIG. 5, and example details about the makeup and functionality of power supply circuit 170 are provided with reference to FIGS. 6 and 7A-B.

Figure 2:
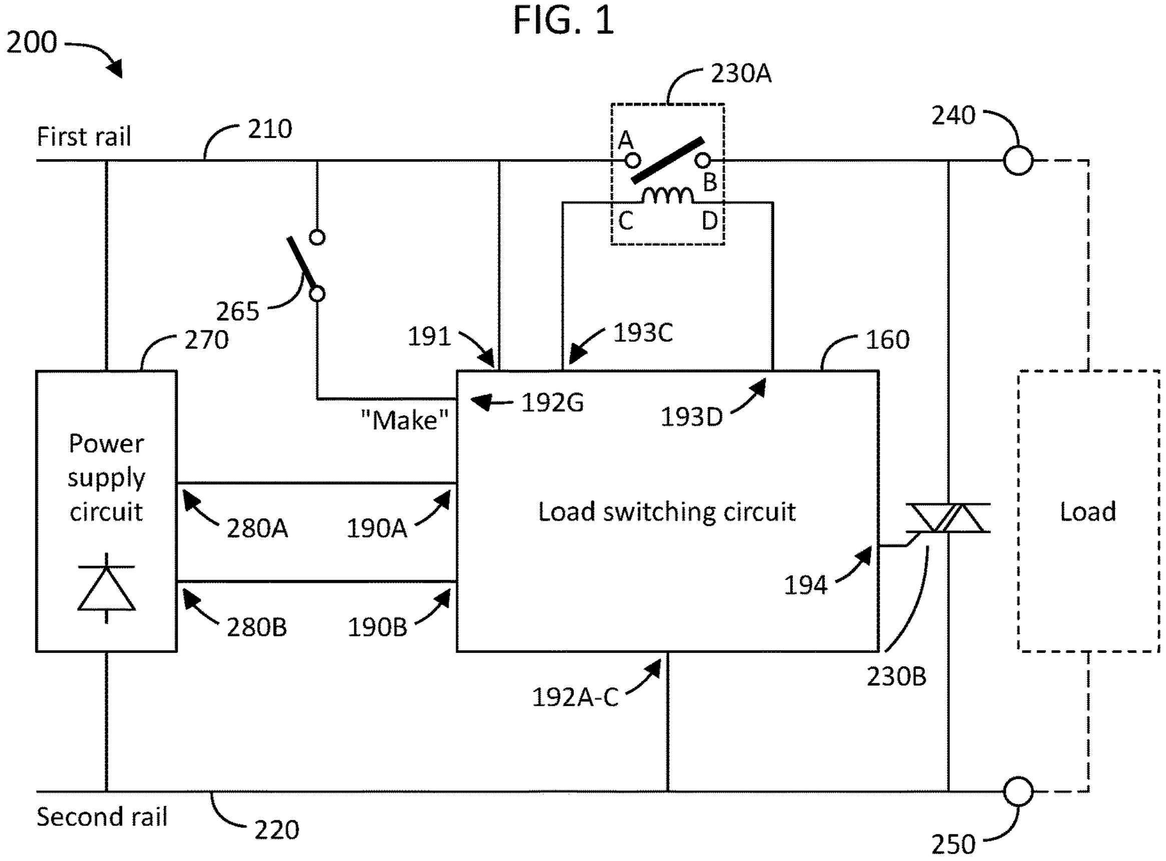
FIG. 2 illustrates another implementation of a load switching system that provides swell and surge protection.

FIG. 2 illustrates another implementation of a load switching system 200 that provides swell and surge protection. This system has the same or similar components as load switching system 100, and like components have like numbering. However, in this case power supply circuit 270 receives and rectifies the supply current from second rail 220, and load switching circuit 160 returns it via common terminal 191 into first rail 210. The input terminal(s) 192A-C are coupled with second rail 220.

In both FIGS. 1 and 2, the relay interrupts the first rail. It is normal for load switching systems to interrupt a "Line" rail rather than a "Neutral" rail, as not interrupting a Line rail would leave the load exposed to a potentially dangerous high voltage even when unused. Thus, both FIGS. 1 and 2 are suitable implementations when the first rail represents a Line rail and the second rail represents a Neutral rail.

Figure 3:
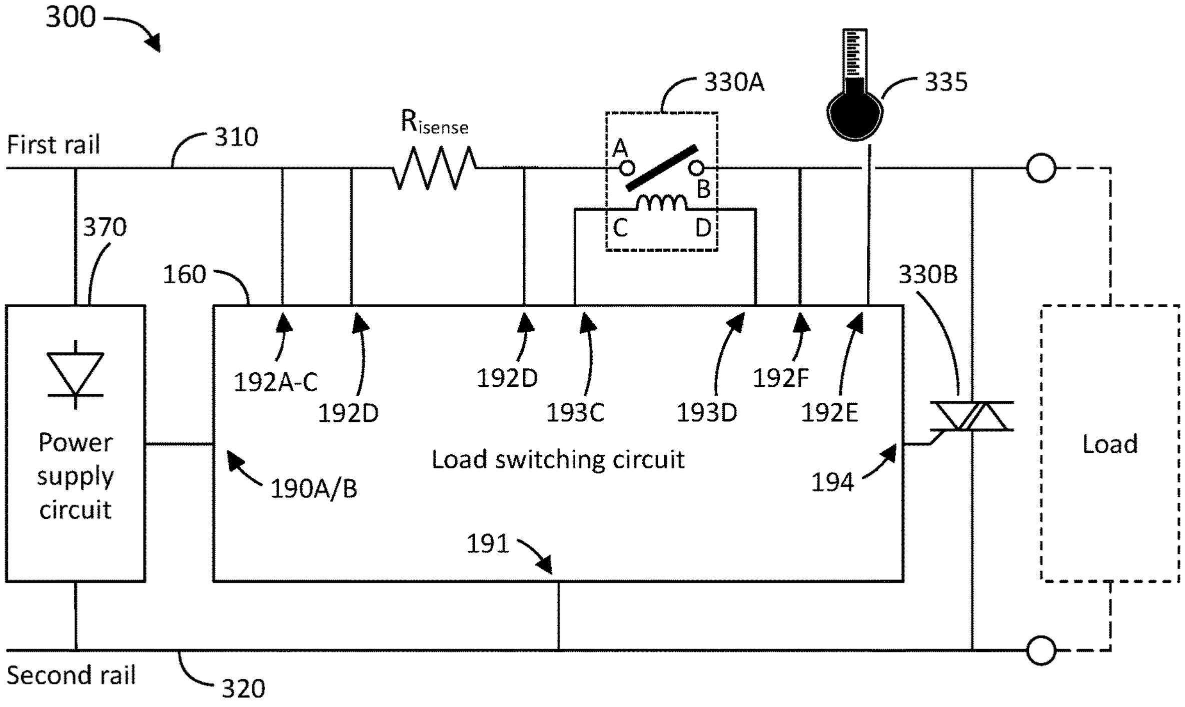
FIG. 3 illustrates an example load switching system that provides additional protection.

FIG. 3 illustrates an example load switching system 300 that provides additional protection. Load switching system 300 includes first rail 310, second rail 320, series switch 330A (which may be a latching relay), temperature sensor 335 (which may be or include a semiconductor-based sensor, a temperature-dependent resistor, a thermocouple, a thermistor, an infrared light based sensor, or any other device that can convert a temperature to a voltage, a current, a resistance, or a digital signal), load switching circuit 160, power supply circuit 370, and shunt switch 430B, which may be or include a TRIAC as drawn, a thyristor, a MOSFET, or any other fast power switch. It further includes a current sense device (here shown as a current sense resistor $R_{isense}$, but it may in general be or include a current sense loop, a current sense transformer, a Hall effect sensor, an inductor, a capacitor, a current sense resistor, or any other device that responds to a current). Power supply circuit 370 is coupled between first rail 310 and second rail 320. At its output, it may deliver one or more supply voltages that are positive with respect to second rail 320. Most of the supply power of load switching circuit 160 flows as a current from first rail 310 via power supply circuit 370 and supply power input terminal(s) 190A-B into load switching circuit 160, returning via its common terminal 191 into second rail 320.

Load switching system 300 is configured to supply power from first rail 310 and second rail 320 to a load, and to decouple the load from the power lines when conditions exist that could damage the load or otherwise be dangerous or undesirable. The load is coupled with the power lines via series switch 330A and the current sense device ($R_{isense}$). Load switching circuit 160 controls the relay via coil control terminal(s) 193C-D. It switches off series switch 330A as soon as it senses that sufficient power to operate the relay may be available, and it switches off series switch 330A as soon as it senses that insufficient power to operate may be available. When sufficient power is available from the power lines (but not too much), it switches on series switch 330A. At that time, a current will start flowing through the current sense device, series switch 330A, and the load. Load switching circuit 160 measures the current by monitoring a voltage over $R_{isense}$ at input terminal(s) 192D-D. If it detects that the current is larger than a preset current threshold (an overcurrent condition), load switching circuit 160 switches off series switch 330A. Rather than assuming that series switch 330A switch as required, load switching circuit 160 monitors the state of series switch 330A at relay state sense input terminal(s) 192F so that it can take measures if series switch 330A fails. Relays can be slow, since they include moving mechanical parts, and they may be too slow to always protect a load from fast surges. Load switching circuit 160 may detect fast surges, swells, and other power line phenomena, at power sense input terminal(s) 192A-C. In the case of a fast surge, load switching circuit 160 sends a signal from shunt switch control terminal 194 to shunt switch 330B to protect the load by short-circuiting it until switch 330 has opened. Temperature sensor 335 may provide a temperature signal to input terminal(s) 192E. Load switching system 300 may use temperature information in several ways. For example, it may modify the first delay time and/or the second delay time as a function of the sensed temperature (latching relay make and break times are temperature dependent), and switch off switch 330 when the temperature exceeds a temperature threshold.

Figure 4:
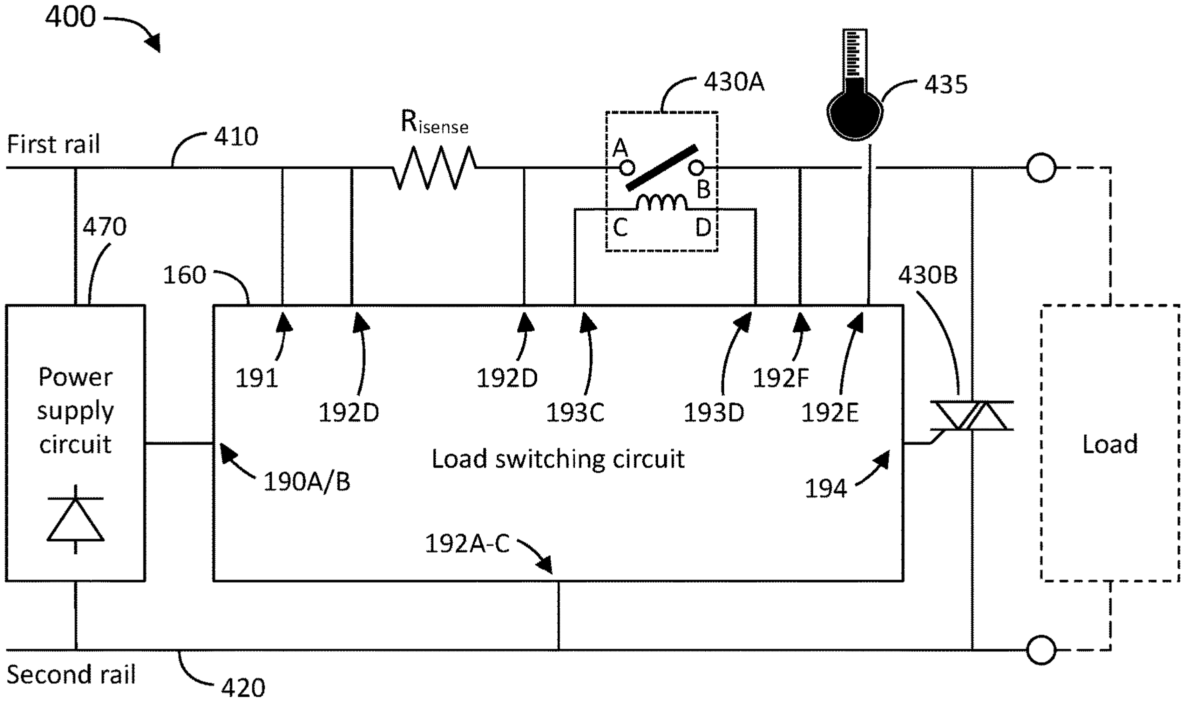
FIG. 4 illustrates another implementation of a load switching system that provides additional protection.

FIG. 4 illustrates another implementation of a load switching system 400 that provides additional protection. Load switching system 400 includes first rail 410, second rail 420, series switch 430A (which may be a latching relay), temperature sensor 435 (which may be or include a semiconductor based sensor, a temperature-dependent resistor, a thermocouple, a thermistor, an infrared light based sensor, or any other device that can convert a temperature to a voltage, a current, or a resistance), load switching circuit 160, power supply circuit 470, and shunt switch 430B, which may be or include a TRIAC as drawn, a thyristor, a MOSFET, or any other fast power switch. It further includes a current sense device (here shown as a current sense resistor $R_{isense}$, but may in general be or include a current sense loop, a current sense transformer, a Hall effect sensor, an inductor, a capacitor, a current sense resistor, or any other device that responds to a current). Power supply circuit 470 is coupled between first rail 410 and second rail 420. At its output, it may deliver a supply power that includes a positive voltage with respect to first rail 410. Most of the supply power of load switching circuit 160 flows as a current from second rail 420 via power supply circuit 470 into supply power input terminal(s) 190A-B, returning via its common terminal 191 into first rail 410.

Load switching system 400 is configured to supply power from first rail 410 and second rail 420 to a load, and to decouple the load from the power lines when conditions exist that could damage the load or otherwise be dangerous or undesirable. The load is coupled with the power lines via series switch 430A and the current sense device ($R_{isense}$). Load switching circuit 160 controls the relay via coil control terminal(s) 193C-D. It switches off series switch 430A as soon as it senses that sufficient power to operate may be available, and it switches off series switch 430 as soon as it senses that insufficient power to operate may be available. When sufficient power is available from the power lines, but not too much, it switches on series switch 430. At that time, a current will start flowing through the current sense device, switch 430, and the load. Load switching circuit 160 measures the current by monitoring a voltage between the input terminal(s) 192D-D. If it detects that the current is larger than a preset current threshold (an overcurrent condition), load switching circuit 160 switches off series switch 430. Rather than assuming that series switch 430 switches as planned, load switching circuit 160 monitors the state of series switch 430 at input terminal(s) 192F so that it can take action if switch 430 fails. Relays can be slow, since they include moving mechanical parts, and they may be too slow to always protect a load from fast surges. Load switching circuit 160 may detect fast surges, and other phenomena, at its input terminal(s) 192A-C. When it detects a fast surge, load switching circuit 160 sends a signal via its shunt switch control terminal 194 to shunt switch 430B to short-circuit the load until series switch 430 has opened. Temperature sensor 435 may provide temperature information to input terminal(s) 192E. Load switching system 400 may use temperature information in several ways. For example, it may change the delay times (first delay time, second delay time) as a function of the temperature (latching relay make and break times are temperature dependent) and switch off series switch 430 when the temperature exceeds a temperature threshold.

FIG. 5 illustrates an example load switching circuit 160 as may be used in the load switching systems of FIGS. 1-4. Load switching circuit 160 includes various subcircuits that may be powered from its supply power (supply A, supply B), which is applied between supply power input terminal(s) 190A-B and common terminal 191. A supply power availability detector (SPA detector 510H) is coupled between supply power input terminal(s) 190A and/or B and common terminal 191, and has an output that is coupled with control logic 520. SPA detector 510H is configured to detect availability of supply power at supply power input terminal(s) 190A and/or B within sixty (60) milliseconds, and in some implementations within five (5) milliseconds. Load switching circuit 160 is configured to provide a second coil control output signal on the one or more coil control terminals (e.g., coil control terminal(s) 193C-D and center tap coil control terminal(s) 193E) within three hundred (300) milliseconds after receiving a power-up signal from SPA detector 510H. In some cases, load switching circuit 160 is configured to provide the second coil control output signal on the coil control terminal(s) within five (5) milliseconds after receiving the power-up signal from SPA detector 510H. The second coil control output signal is a signal meant to release the relay so that it decouples the load from the mains power lines. An implementation provides the second coil control output signal as quickly as possible upon detecting availability of the supply power to prevent possibly dangerous initial conditions from damaging the load or from presenting hazardous conditions. In case of a latching relay with two coil terminals, an implementation may provide a differential signal between coil control terminal(s) 193A and B. In that case, the first coil control output signal might be a positive pulse and the second coil control output signal might be a negative pulse. In case of a latching relay with three coil terminals, an implementation may provide a first coil control output signal between coil control terminal(s) 193C and E, and a second coil control output signal between coil control terminal(s) 193D and E.

SPA detector 510H may comprise a power-up detector (that generates the power-up signal) and/or a power-down detector (that generates a power-down signal when power is lost). For controlling a latching relay, the first coil control output signal (to operate) may be a first pulse shorter than three hundred (300) milliseconds and the second coil control output signal (to release) may be a second pulse shorter than two hundred (200) milliseconds. In some implementations (controlling a relay other than a latching relay), the first coil control signal may be a zero-volt signal that is continuously applied, and the second coil control signal may be a positive or negative voltage signal that is continuously applied.

Detectors for various make conditions and break conditions are coupled with input terminal(s) 192A-F. And each detector has an output that is coupled with control logic 520. For example, input terminal(s) 192A is coupled with rail voltage detector 510A, which is configured to detect if an AC or DC voltage is present between power rails (providing a "rail voltage present" signal, or more specifically a "DC present" and/or "AC present" signal), and which may further detect the timing of zero crossings in AC signals, and whether there is a rail failure (a break condition). Examples of rail voltage detectors are described with reference to FIGS. 9-10.

Input terminal(s) 192B is coupled with a swell detector 510B, which is configured to detect if a rail voltage is within a specified range that may be determined by a lower and/or an upper threshold, and deliver a "swell detected" signal to control logic 520. Swells are slow changes outside of the specified range. A swell is a break condition. Examples of swell detectors are described with reference to FIGS. 11-12.

Input terminal(s) 192C is coupled with surge detector 510C, which is configured to detect if a rail voltage exceeds a specified range for a short time, and deliver a "surge detected" signal to control logic 520. A surge is a break condition. An example of a surge detector is described with reference to FIG. 15.

Input terminal(s) 192D is/are coupled with overcurrent detector 510D, which is configured to sense whether a current through a load (rather, through a current sense device) exceeds a limit. Overcurrent is a break condition. Overcurrent detector 510D may include an amplifier stage to amplify a signal sensed at input terminal(s) 192D, coupled with a condition detector such as described with reference to FIG. 11.

Input terminal(s) 192E is coupled with temperature sense detector 510E, which is configured to detect information about a temperature, and communicate the information to control logic 520. Temperature sense detector 510E may include an analog-to-digital converter (ADC) to convert an analog signal that represents the temperature to a digital signal suitable for control logic 520. Input terminal(s) 192E may be coupled with an external temperature sensor that includes, for example, a semiconductor-based sensor, a temperature-dependent resistor, a thermocouple, a thermistor, or an infrared-light-based sensor.

Input terminal(s) 192F is coupled with relay status detector 510F, which is configured to detect the status of a relay, e.g., whether a latching relay such as series switch 330A or series switch 430A is open or closed. It does so by comparing the voltage at the B contact of the relay (at input terminal(s) 192F) with the voltage at the A contact of the relay (in this example available at input terminal(s) 192D, or which in another implementation may be available at a second input terminal(s) 192F). For a DC application, an implementation may compare voltage levels. For an AC application, an implementation may compare timing of zero crossings before and after the relay. An example of a relay status detector for AC systems is described with reference to FIG. 16.

In addition to responding to the presence and/or absence of certain conditions, load switching circuit 160 can be triggered to set an external relay (i.e., to provide a second coil control output signal on the coil control terminals) by providing a "must make" signal on "must make" input terminal(s) 192G. Input terminal(s) 192G may be directly coupled with control logic 520, as an input signal may qualify for digital use. Alternatively, there may be a Schmidt trigger or a de-bouncing circuit between input terminal(s) 192G and control logic 520. A "must make" signal is a make condition.

Control logic 520 receives supply power from supply power input terminal(s) 190B (Supply B) and receives input signals from detector 510A-H and input terminal(s) 192G. It includes logic, for example combinational logic, registers, memory, and/or processor circuits, that combines the information from its input signals to control make timer 530, break timer 540, relay driver 550, and shunt switch control terminal 194. In some implementations, the make timer and the break timer are combined in a single timer with configurable and/or selectable delay time. In further implementations, the relay driver may be combined with the make timer and/or break timer.

Control logic 520 has various functions. For example, it:

Provides a second coil control output signal on the one or more coil control terminals within three hundred (300) milliseconds after receiving a power-up signal from the SPA detector 510H.

Starts the start timer upon receiving a "must make" signal and waits for a first delay time, then provides a first coil control output signal on the one or more coil control terminals.

Starts the timer upon receiving a "break condition present" signal from one of the detection circuits to wait for a second delay time, then provides the second coil control output signal on the one or more coil control terminals, wherein the "break condition present" signal indicates the presence of a break condition relevant to the particular detector.

Provides the second coil control output signal on the one or more coil control terminals within five (5) milliseconds after receiving a signal ("rail fail") from the rail voltage detector 510A indicating a loss of the input voltage.

Provide a shunt switch control signal on the shunt switch control terminal 194 upon receiving a "surge detected" signal from the surge detector.

Parts or all of the circuits in FIG. 5, and parts or all of the subcircuits in FIG. 5 may be comprised in an IC, on a printed circuit board (PCB), or a module.

Control logic 520 controls the make time for make timer 530 and the break time for break timer 540, and it triggers make timer 530 when a load must be coupled with the power lines or it triggers break timer 540 when the load must be decoupled from the power lines. Relay driver 550 may be directly coupled with make timer 530 and break timer 540 as drawn, or indirectly via control logic 520. Relay driver 550, when triggered, generates a first coil control signal or a second coil control signal. For example, in the case of a latching relay with two control terminals (C and D), it may deliver the first coil control signal on coil control terminal(s) 193C while coupling coil control terminal(s) 193D with common terminal 191, and it may deliver the second coil control signal on coil control terminal(s) 193D while coupling coil control terminal(s) 193C with common terminal 191. For a latching relay with three control terminals (C-E) where the E-terminal is a center tap of the coil, relay driver 550 may deliver the first coil control signal between coil control terminal(s) 193C and E, and the second coil control signal between coil control terminal(s) 193D and E. Relay driver 550 may use supply power from supply power input terminal(s) 190A, so that the relay coil can be driver by a different voltage (usually higher) than the internal logic of load switching circuit 160. For example, relay driver 550 may deliver the first coil control signal and the second coil control signal at a voltage that is higher than the rated continuous coil control voltage for the latching relay, whereas the pulses delivered by make timer 530 and break timer 540 are of a short duration, so that the relay coil does not heat up (and burn out). The higher voltage will result in faster make and break times, which will be less damaging to the relay, and therefore result in less degradation over time of its reliability.

Also based on its input signals, especially from surge detector 510C, control logic 520 generates a control signal for a shunt switch, such as a TRIAC or other fast switching device. It delivers the control signal at shunt switch control terminal 194. In some implementations, control logic 520 may include another timer to time the control signal.

FIGS. 6A-B illustrate examples of a power supply circuit 600 and power supply circuit 650. They may be used to implement power supply circuit 170 in FIG. 1 in an AC system.

Power supply circuit 600 is very cheap to build. However, it may not support all benefits that load switching system 100 is capable of. A diode $D_S$ rectifies an AC voltage between first rail 110 and second rail 120. $D_S$ is coupled in series with resistor $R_S$ and shunt capacitor $C_S$. Shunt capacitor $C_S$ stabilizes the voltage at supply power output(s) 180, however, the voltage depends on the current drawn by load switching circuit 160 and the value of resistor $R_S$. For the voltage to be low, the current must be high (but that is undesirable) and/or the resistor $R_S$ must be large. For the voltage to be sufficiently stable to operate load switching circuit 160 reliably, $C_S$ must be sufficiently large. If the product of $R_S$ and $C_S$ is large, then it will take much time to charge capacitor $C_S$ and take the voltage at supply power output(s) 180 high enough for load switching circuit 160 to start operating. In some situations, this time may be too large for some of the safety features that load switching system 100 offers. In those cases, an implementation with an improved power supply circuit, such as described with reference to FIG. 6B or FIGS. 7A-B, may be preferred.

In FIG. 6B, diode D1 rectifies the AC voltage between first rail 110 and second rail 120 and provides the voltage to an active circuit. Its output voltage $V_{OUT}$ is equal to the sum of the Zener voltage of Zener diode D2 and the forward diode voltage of the emitter of transistor Q1 (i.e., the base emitter voltage $V_{BE}$). A relatively small current runs from diode D1 through resistor R2 through transistor Q1 and Zener diode D2. Transistor Q3 delivers the output current. Resistor $R_1$ is optional and only needed if power supply circuit 650 is not always loaded at supply power output(s) 180. Optional resistors $R_2$ and $R_3$ lower the collector voltages for Q1 and Q3, respectively, to protect Q1 and Q3 from burning out. Capacitor $C_1$ is a shunt capacitor that reduces the ripple in the voltage at supply power output(s) 180. Compared to power supply circuit 600, power supply circuit 650 has a better defined and much more stable output voltage $V_{OUT}$, and a sufficient level of supply voltage at supply power output(s) 180 is reached much faster because Q3 provides a low-impedance source that charges $C_1$, while maintaining efficiency.

FIGS. 7A-B illustrate another example power supply circuit 700 and an example variation (power supply circuit 750). FIG. 7A shows first rail 110 and second rail 120, where an AC voltage in between is rectified by diode D1. The rectified voltage at the cathode of D1 is applied to the collector of (bipolar) transistor Q1 via resistor R3. The emitter of Q1 is coupled with second rail 120 via Zener diode D2. Resistor R1 is coupled between the base of Q1 at node 710 and second rail 120, and resistor R2 is coupled between node 710 and output node 720.

Transistors Q2 and Q3 are bipolar transistors in a Darlington configuration, which functions as an emitter follower with its output coupled with output node 720, and a control node coupled with resistor R3 and the collector of Q1. The Darlington circuit has a current input coupled with diode D1 and resistor R3. Resistors R1 and R2 form a voltage multiplier powered by Q2/Q3 and controlled by the base voltage $V_{REF}$ at node 710. Thus, the voltage $V_{OUT}$ (with respect to second rail 120) equals $V_{REF}$×(R1+R2)/R1. $V_{REF}$ is the sum of the Zener voltage across diode D2 and the base-emitter voltage of Q1 which depends on several factors, including the transistor fabrication parameters, the temperature, and the collector current according to the Ebers-Moll equation. For normal collector currents and room temperature, the base-emitter voltage is usually around 0.6 to 0.7 Volts. If the Zener voltage equals, for example, 4.3 Volts and the ratio of R2 and R1 equals, for example, 1, then the resulting output voltage $V_{OUT}$ equals 2 $V_{REF}$ or roughly 10 Volts. Resistor R3 serves to limit the collector current and voltage of Q1, preventing damage to Q1 from exceeding the collector-emitter breakdown voltage, and it provides the bias voltage for emitter follower Q2/Q3.

Many variations of this basic circuit are possible. For example, the Darlington pair Q2/Q3 could be composed of field-effect transistors (FETs) instead of bipolar transistors, or it could be replaced by a single FET functioning as a source follower (as will be shown in FIG. 7B) or even a single bipolar transistor or IGBT functioning as an emitter follower. A FET or bipolar transistor could be discrete or integrated. Power supply circuit 700 could be fully or partially integrated, or could be fully built from discrete devices. Although power supply circuit 700 is shown with NPN transistors (N-type transistors), it could be implemented with PNP or P-type transistors. Additional devices may provide additional protection or stability. Some implementations may leave out Zener diode D2 to save costs at the expense of precision, or replace D2 with a circuit that provides a voltage that is proportional to the absolute temperature (PTAT) to compensate for the temperature dependence of the base-emitter voltage of Q1.

FIG. 7B shows a variation of the circuit of FIG. 7A. In this implementation, transistor Q1 and diode D2 are replaced by a shunt voltage regulator REF, such as TL431 (https://en.wikipedia.org/wiki/TL431). The shunt voltage regulator operates similar to an NPN bipolar transistor, but instead of a base-emitter voltage VBE of 0.6-0.7 Volts it has a reference voltage $V_{REF}$ of 2.5V. Thus, the voltage at node 760 equals 2.5V, and the output voltage at node 770 is determined by the ratio of R5 and R4 and $V_{REF}$. In this example implementation, a Zener diode D4 protects Q4 by limiting the voltage at node 780 to between 0.7 Volts below $V_{OUT}$ and the diode D4 Zener voltage above $V_{OUT}$. Resistor R7, between rectifier diode D3 and first rail 110, limits the voltage at the drain of FET Q4 which functions as a source follower.

Again, many variations are possible. In some implementations, diode D3 and resistor R7 are swapped. FET Q4 could be replaced by an IGBT, a bipolar transistor, or a Darlington pair (FET or bipolar). Q4 could be discrete or integrated. Power supply circuit 750 could be fully or partially integrated, or could be fully built from discrete devices. Although power supply circuit 750 is shown with an N-type transistor, it could be implemented with a P-type transistor. Additional devices may provide additional protection or stability.

Power supply circuit 700 and power supply circuit 750 are inherently fast because the shunt capacitors C1 and C2 are charged by the source followers/emitter followers Q2/Q3 and Q4, which have a low-impedance output, whereas shunt capacitor Cs of power supply circuit 600 is charged through resistor Rs, which must have a high value to not waste current. Thus, power supply circuit 700 and power supply circuit 750 can provide power within, for example, a quarter cycle of the AC voltage between first rail 110 and second rail 120, without wasting power on an ongoing basis.

Figure 8:
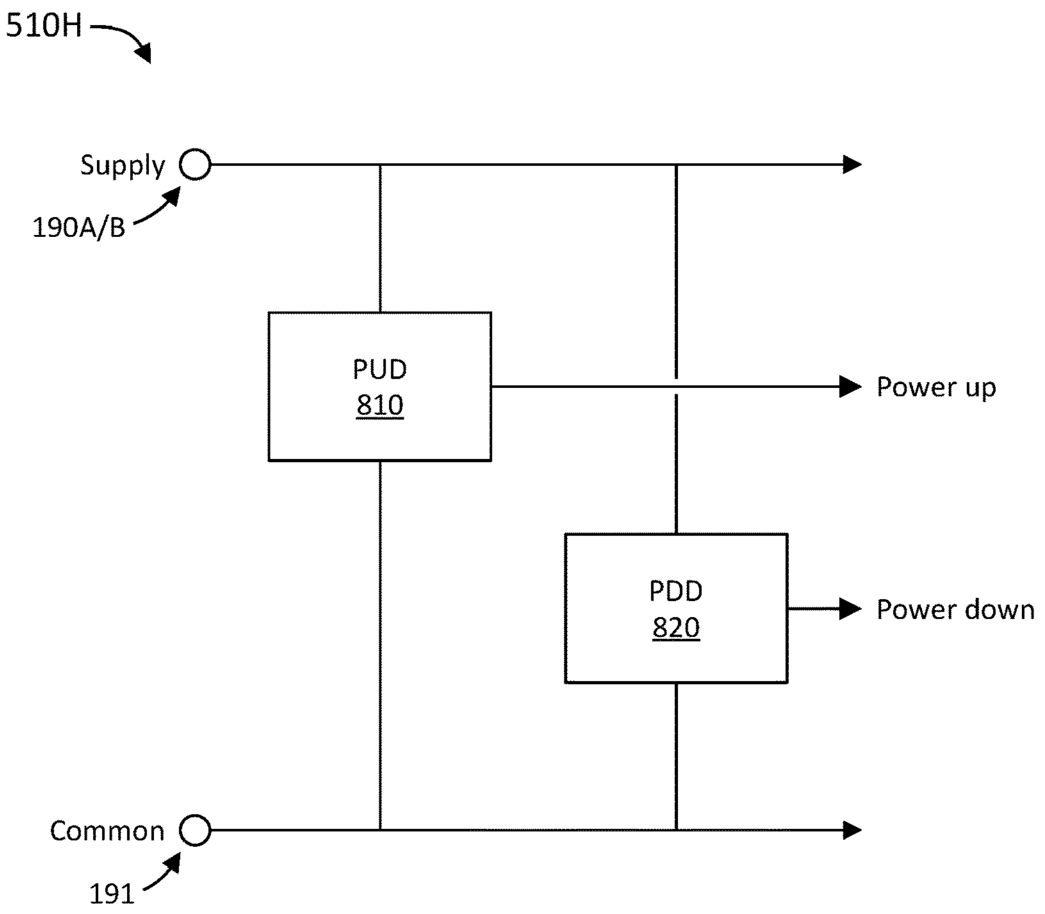
FIG. 8 illustrates an example of a SPA detector and its power-up timing.
Figure 8:
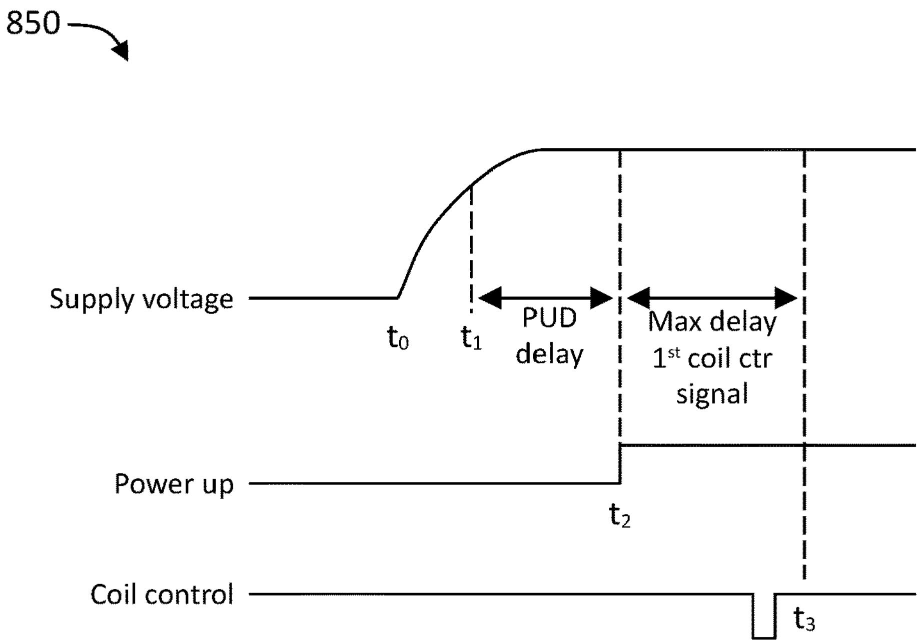

FIG. 8 illustrates an example of a SPA detector 510H and its power-up timing. The circuit diagram shows that the SPA detector may comprise a power-up detector 810 (PUD) and a power-down detector 820 (PDD). A PUD is more commonly known as a power-on reset circuit, and many such circuits are known in the art. PUDs usually feature a delay (here called the PUD delay) between first detecting a sufficiently high supply voltage and providing a "power-up" (or "power-on") signal at their output. The delay is often obtained by charging a capacitor, and the PUD delay helps to overcome noise, glitches, and instabilities while the supply voltage settles. However, in the technology presented herein, the PUD delay must be short, as one of the first things an implementation that includes a latching relay must do is to reset the latching relay. A PDD is more commonly known as a power failure detector. It typically is fast, as any actions on a "power-down" or "fail" signal must be taken before all remaining energy has dissipated. Again, may PDD circuits are known in the art. Most known PUD and PDD circuits may be used in implementations, as long as they're configured for short delay times.

The timing diagram 850 shows how the load switching circuit's controller acts on the signals. It shows an example of the supply voltage (at supply power input terminal(s) 190A or B) over time. Before time $t_0$, the supply voltage may be zero, and at $t_0$ it starts increasing. At time $t_1$ it reaches a sufficient level for power-up detector 810 to start working, and after the PUD delay, at time $t_2$, power-up detector 810 asserts the power-up signal. Control logic 520 receives the power-up signal from the PUD, and before the end (at time $t_3$) of a maximum delay time for the first coil control signal, the controller asserts the second coil control output signal. In implementations, the maximum delay time for the first coil control signal is three hundred milliseconds (300 ms), and in further implementations the maximum delay time for the first coil control signal is five milliseconds (5 ms) or shorter. The shorter the combined time for the PUD delay and the maximum delay time for the first coil control signal, the better.

Figure 9:
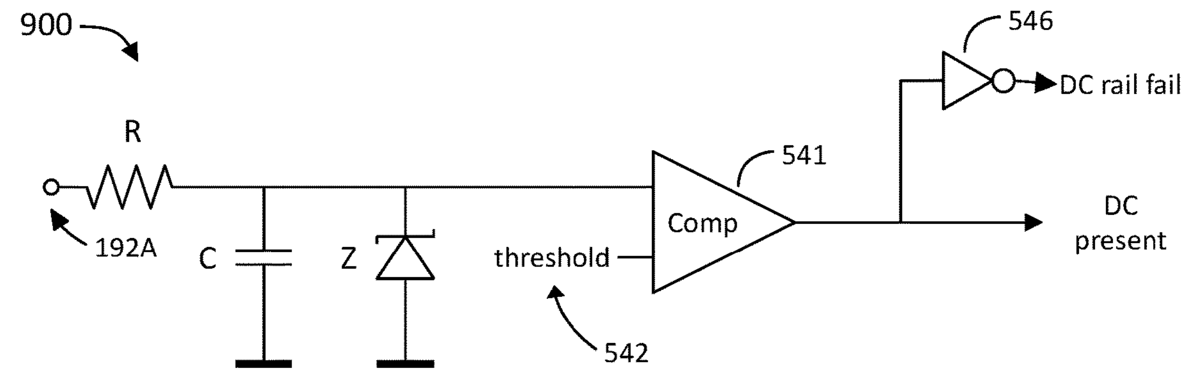
FIG. 9 illustrates an example rail voltage detection circuit for use in DC systems.

FIG. 9 illustrates an example rail voltage detector 900 for use in DC systems. Rail voltage detector 900 may include a resistor (R), a capacitor (C), a Zener diode (Z), a comparator 541 (which may be included in a Schmitt trigger), and a threshold source 542. Or, rail voltage detector 900 includes threshold source 542 coupled with comparator 541, wherein comparator 541 is configured to receive at least a fraction of a DC input voltage (e.g. the voltage from first rail 110 or from second rail 120). Comparator 541 and threshold source 542 may be included, for example, in an IC. A resistive divider (two or more resistors in series) could divide the DC input voltage down to a fraction of it, if needed. Or, as shown in FIG. 9, the resistor R and the Zener diode Z could divide the input voltage down to a fraction of it (and clamp it to protect comparator 541 from swells and surges in the input voltage), whereas the capacitor C could suppress radio frequency (RF) components at the input of comparator 541.

The output of comparator 541 signals whether the (fraction of) the input voltage at power line sense input terminal(s) 192A is larger than the threshold voltage from threshold source 542, and is an indicator for the presence of the DC input voltage. An inverter 546 may invert this signal to indicate a DC rail failure and provide a "DC rail fail" signal.

Figure 10:
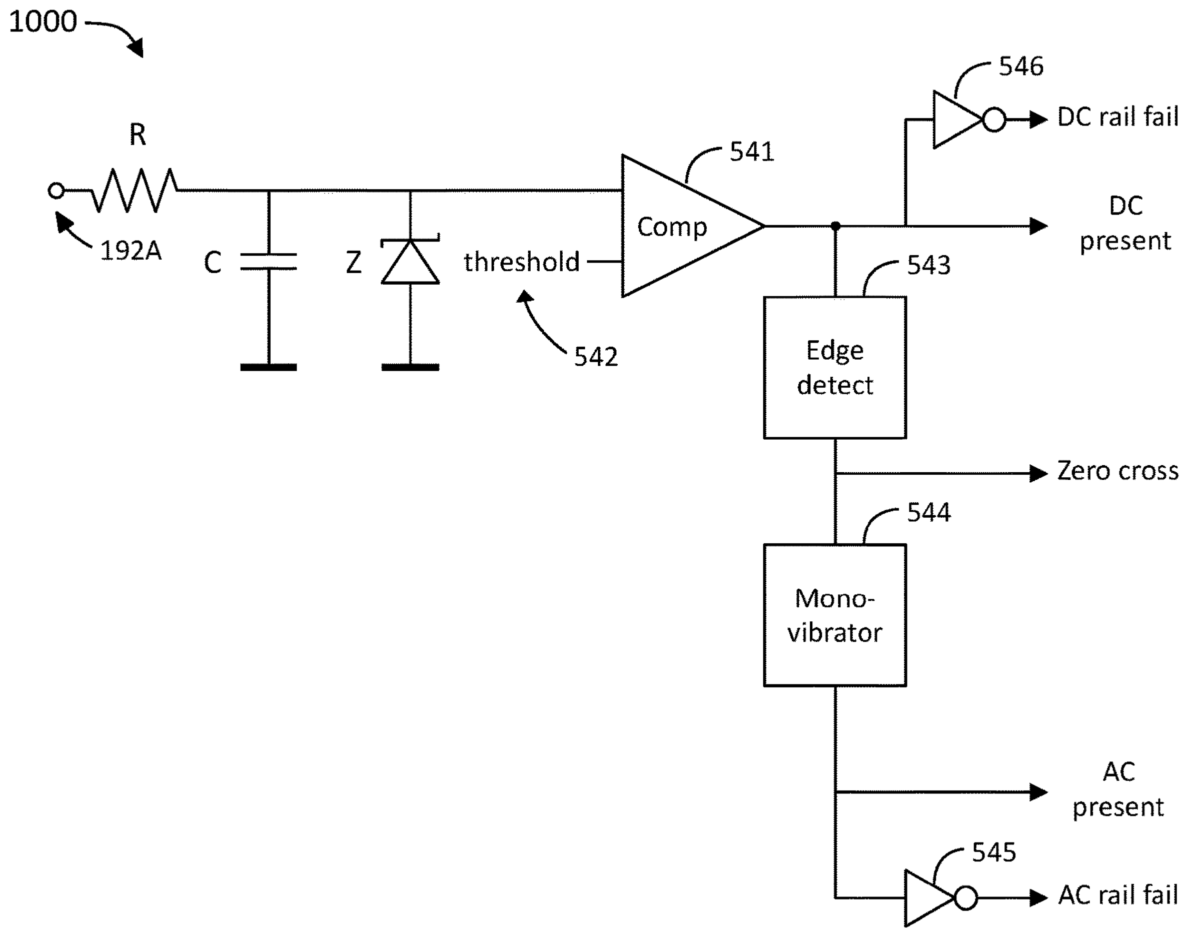
FIG. 10 illustrates an example rail voltage detection circuit for use in AC systems and DC systems.

FIG. 10 illustrates an example rail voltage detector 1000 for use in AC systems and DC systems. Rail voltage detector

1000 may include the same devices as rail voltage detector 900 in FIG. 9, and additionally an edge detection circuit 543, a monostable multivibrator 544 and an inverter 545. As in rail voltage detector 900, the output of comparator 541 (which may be included in a Schmitt trigger) indicates whether a DC voltage is present. Inverter 546 may invert this signal to indicate a DC rail failure and provide a "DC rail fail" signal. An AC input voltage applied at power line sense input terminal(s) 192A or at the input of comparator 541 is compared with a threshold voltage provided by threshold source 542. At the output of comparator 541 may be a square wave whose frequency equals the frequency of the input voltage. Dependent on the amplitude of the input voltage and the values of R, C, Z, and the threshold voltage, the edges of the square wave coincide closely with the zero crossings in the input voltage, or they may be pulled together in pairs, resulting in a square wave whose duty cycle is not exactly 50% even if the AC input voltage was an ideal sine wave. Edge detection circuit 543 detects the edges in the square wave and may output a pulse for each rising edge and a pulse for each falling edge. The output signal of edge detection circuit 543 may be a pulse train (with a frequency twice that of the input signal) coinciding with the zero crossings. Monostable multivibrator 544, which may have a pulse duration larger than the duration of half a cycle in the AC input signal (and in many cases shorter than the duration of a full cycle in the AC input signal), turns the pulse train into a continuous signal representing the presence of the AC input signal, and inverter 545 inverts that signal to provide an "AC rail fail" signal after a zero crossing was missed. The "DC present" and "AC present" signals may be interpreted as "rail voltage present" signals, and in some implementations a "rail voltage present" signal may be derived from the "DC present" and "AC present" signals by an OR gate that takes both signals as input signals. The "DC rail fail" and "AC rail fail" signals may be interpreted as "rail fail" signals, and in some implementations a "rail fail" signal may be derived from the "DC rail fail" and "AC rail fail" signals by an OR gate that takes both signals as input signals.

Whereas the function of the resistor R and the Zener diode Z is, as previously mentioned, to divide down and clamp the input voltage, another perspective is that the Zener diode Z provides rectification of the input voltage. When the input voltage is positive and larger than the Zener voltage, Zener diode Z clamps the signal and outputs the (positive) Zener voltage. When the input voltage is positive and smaller than the Zener voltage, the Zener diode is not active and the input voltage is available at the input of comparator 541. When the input voltage is negative and smaller than a diode forward voltage, the Zener diode is also not active and the input voltage is available at the input of comparator 541. When the input voltage is negative and larger than a diode forward voltage, the Zener diode conducts and clamps the voltage at the input of comparator 541 at minus the diode forward voltage. There are many circuits known in the art that provide rectification, and each of those circuits may be included in an implementation and is within the scope and ambit of the disclosed technology.

Figure 11:
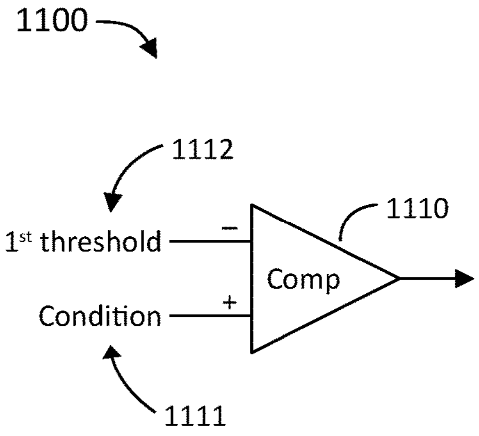
FIG. 11 illustrates an example condition detector that can be used for swell detection with an upper threshold.

FIG. 11 illustrates an example condition detector 1100 that can be used for swell detection with an upper threshold (a first threshold). Condition detector 1100 includes comparator 1110 which has a positive input coupled with a condition input 1111 (such as input terminal(s) 192B) and a negative input coupled with a threshold source 1112 which provides a first threshold voltage. If a condition, represented by a voltage on condition input 1111 exceeds the first threshold voltage, the comparator output will be high. Otherwise, it will be low. Any detector 510A-H may include one or more condition detectors, wherein a condition detector is used to sense a condition of a sensed signal, for example with respect to a predetermined threshold. The condition may include an overvoltage, an undervoltage, and overcurrent, a temperature, a humidity, a pressure, a frequency, or any other physical quantity that impacts the safety of supplying power to a load.

Figure 12:
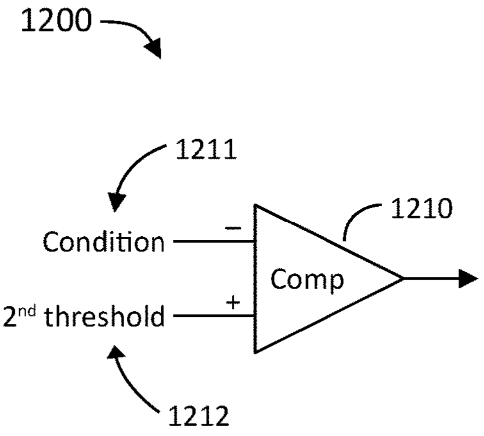
FIG. 12 illustrates an example condition detector that can be used for swell detection with a lower threshold.

FIG. 12 illustrates an example condition detector 1200 that can be used for swell detection with a lower threshold (a second threshold). Condition detector 1200 includes comparator 1210 which has a negative input coupled with a condition input 1211 (such as input terminal(s) 192B) and a positive input coupled with a threshold source 1212 which provides a second threshold voltage. If a condition, represented by a voltage on condition input 1211 does not reach the second threshold voltage, the comparator output will be high. Otherwise, it will be low.

Figure 13:
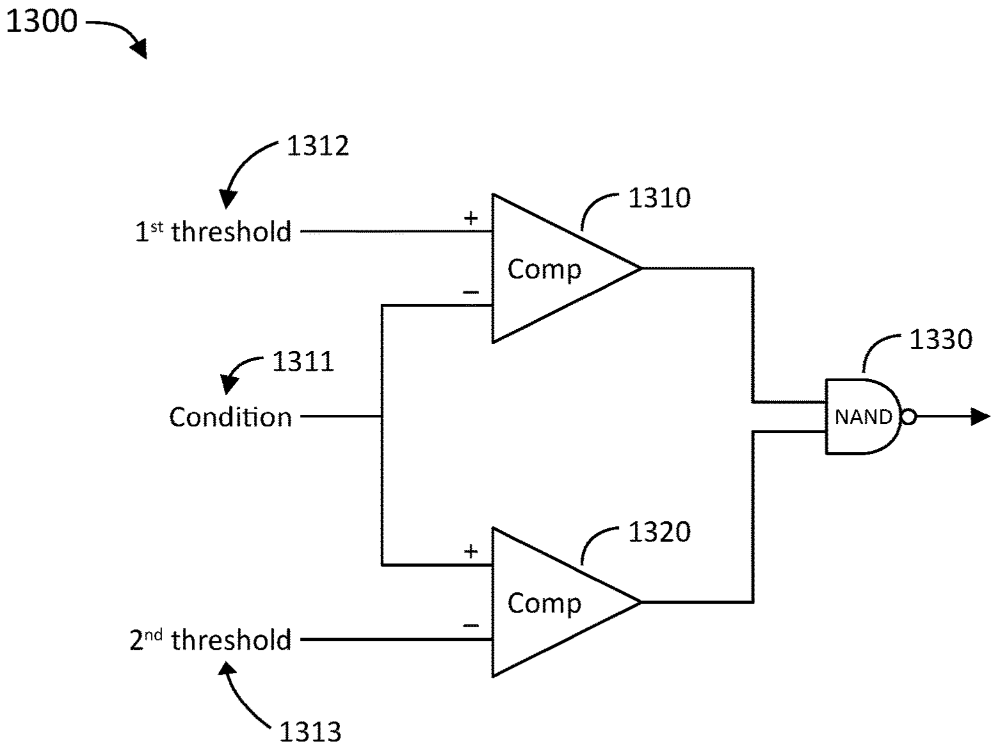
FIG. 13 illustrates an example condition detector that can be used for swell detection with both an upper and a lower threshold.

FIG. 13 illustrates an example condition detector 1300 that can be used for swell detection with both an upper and a lower threshold (the first threshold and the second threshold). Condition detector 1300 includes comparator 1310, comparator 1320, combinational logic circuit 1330, which may include a NAND gate, a condition input 1311, a threshold source 1312 which provides a first threshold voltage, and a threshold source 1313 which provides a second threshold voltage. Condition input 1311 is coupled with the negative input of comparator 1310 and the positive input of comparator 1320. Threshold source 1312 is coupled with the positive input of comparator 1310 and threshold source 1313 is coupled with the negative input of comparator 1320. If a condition, represented by a voltage on condition input 1311 reaches the first threshold and does not exceed the second threshold, the outputs of both comparators are high and the output of combinational logic circuit 1330 is low. Otherwise, the output of combinational logic circuit 1330 is high.

Figure 14:
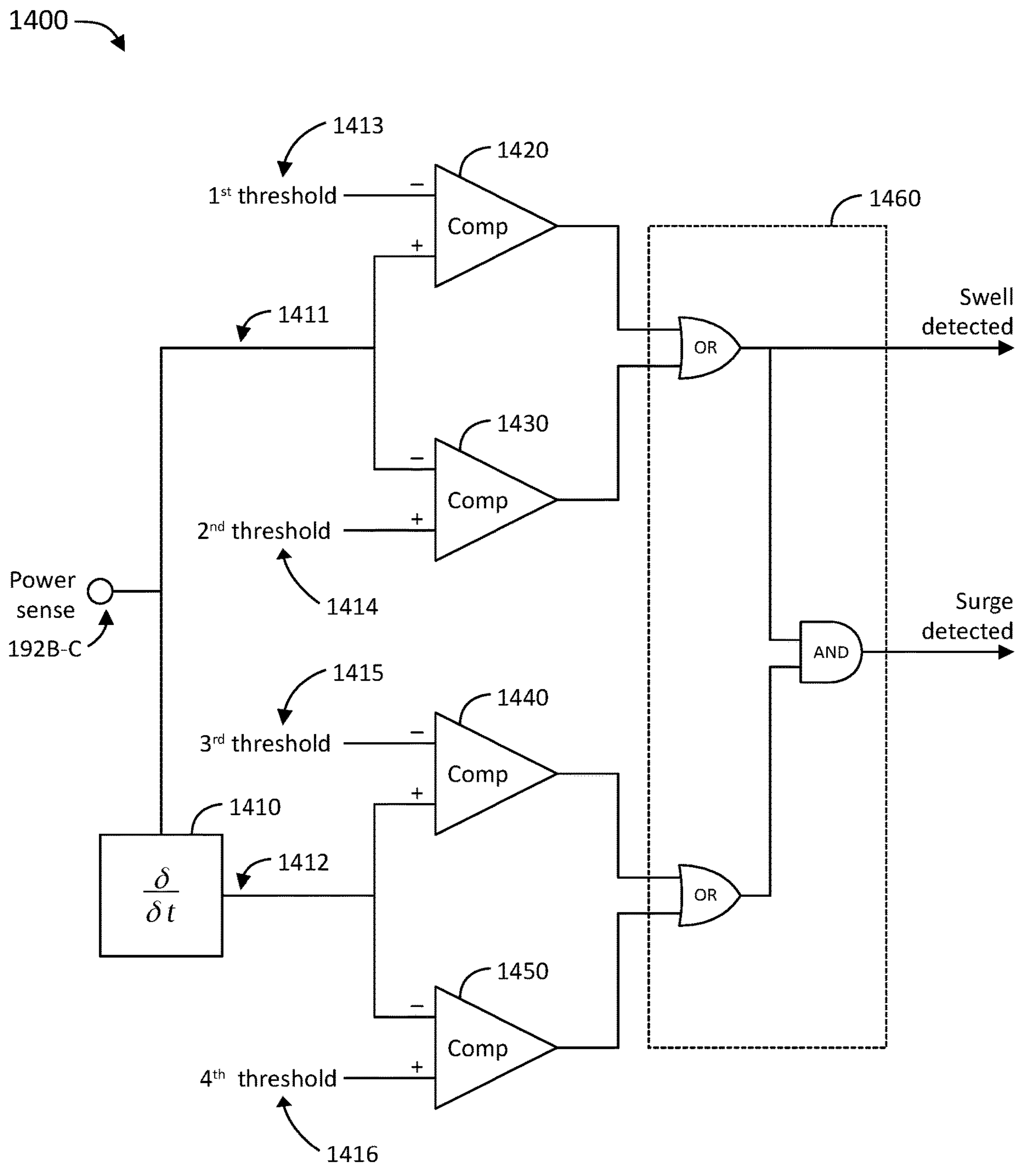
FIG. 14 illustrates an example of a combined swell and surge detector.

FIG. 14 illustrates an example of a combined swell and surge detector 1400. Swell and surge detector 1400 includes differentiator 1410 (or any other high-pass filter), higher swell comparator 1420, lower swell comparator 1430, higher surge comparator 1440, lower surge comparator 1450, and combination circuit 1460 which may include combinational logic and/or memory circuits. Higher swell comparator 1420, lower swell comparator 1430, and differentiator 1410 each receive a signal 1411 from power line sense input terminal(s) 192B-C. Higher surge comparator 1440 and lower surge comparator 1450 each receive a signal 1412 from differentiator 1410.

Swell detection may include comparing the amplitude of a signal at power line sense input terminal(s) 192B-C with a first threshold 1413 (the upper swell threshold) and/or with a second threshold 1414 (the lower swell threshold). Surge detection may include comparing the speed of amplitude change of the signal at the power line sense input terminal(s) 192B-C with a third threshold 1415 (the positive surge threshold) and/or with a fourth threshold 1416 (the negative surge threshold). Differentiator 1410, which is coupled between power line sense input terminal(s) 192B-C and inputs of higher surge comparator 1440 and lower surge comparator 1450, differentiates the amplitude of the signal at power line sense input terminal(s) 192B-C to obtain its speed of change.

Combination circuit 1460 receives input signals of the comparators and determines, either by table lookup (from a memory) or by combinational logic, whether the signal at power line sense input terminal(s) 192B-C qualifies as a swell (its amplitude is higher than first threshold 1413 or lower than second threshold 1414). To qualify as a surge, its speed of amplitude change may need to exceed the positive surge threshold or the negative surge threshold, but also its amplitude needs to exceed the upper swell threshold or the lower swell threshold). An OR function applied to the output signals of higher swell comparator 1420 and lower swell comparator 1430 may determine the presence of a swell and provide a "swell detected" signal. An OR function applied to the output signals of higher surge comparator 1440 and lower surge comparator 1450 may determine whether the speed of amplitude change could indicate a surge, and together with the result of swell detection (an AND function) this determines the presence of a surge (providing a "surge detected" signal).

Figure 15A:
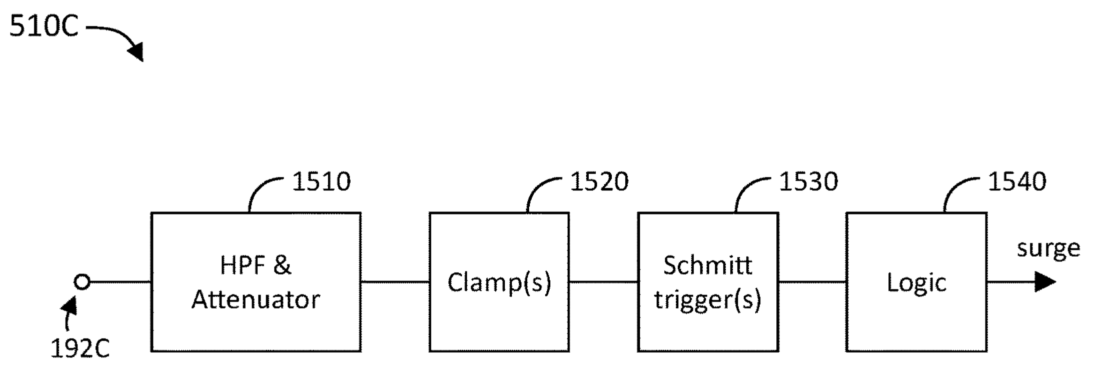
FIGS. 15A-B illustrate another example of a surge detector.
Figure 15B:
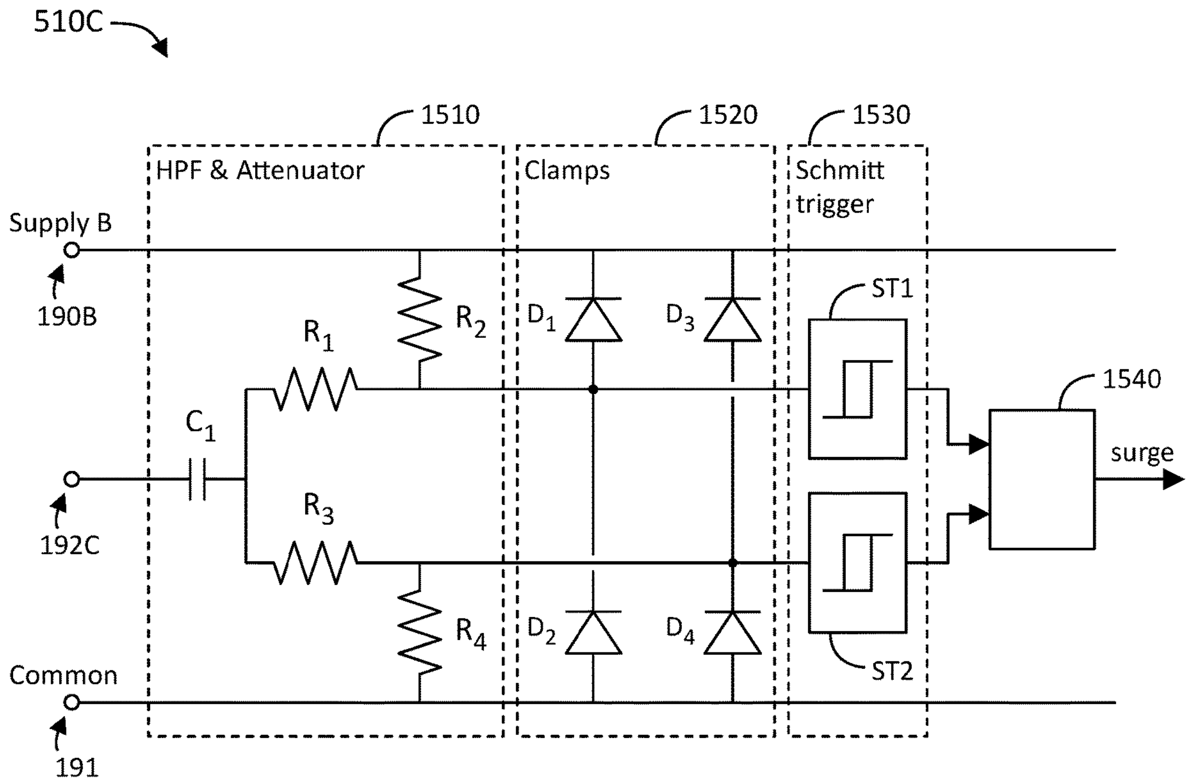

FIGS. 15A-B illustrate another example of a surge detector (surge detector 510C). FIG. 15A shows the general block diagram. Power line sense input terminal(s) 192C is coupled with an input of high-pass filter & attenuator 1510, which is coupled with an input of clamp(s) 1520, which is coupled with an input of Schmitt trigger(s) 1530, which may be coupled with optional logic 1540. High-pass filter & attenuator 1510 removes low-frequency components from the power line sense signal at the input, and attenuates the remaining high-frequency components to a level that determines the surge detector sensitivity. Clamp(s) 1520 clamps the attenuated high-frequency components to ensure that peak surges don't damage sensitive electronics. Schmitt trigger(s) 1530 take(s) the clamped high-frequency components and converts them to one or more digital signals. A Schmitt trigger is a comparator that applies positive feedback to achieve high speeds, and that has a hysteresis that suppresses noise.

It is possible to create a unilateral surge detector, for example a surge detector that detects only positive surges, by using one clamp and one Schmitt trigger. In that case, the output of the Schmitt trigger will indicate that a surge has been detected. To create a bilateral surge detector that detects both positive and negative surges requires using at least two clamps and two Schmitt triggers. Logic 1540 can combine the output signals of the Schmitt triggers to create a surge-detected signal. Logic 1540 may include combinational logic, memory, a lookup table, or any other circuits that combine input signals to create output signals.

FIG. 15B shows an example implementation. In this case, high-pass filter & attenuator 1510 includes two attenuators, $R_1R_2$ and $R_3R_4$, which together with input capacitor $C_1$ form a high-pass filter. Other implementations may have any other combination of passive and/or active devices that create high-pass filters and/or attenuators known in the art. High-pass filter & attenuator 1510 has two output signals, one which has a DC component equal to the supply voltage at supply power input terminal(s) 190B, and one which has a DC component equal to the voltage at common terminal 191. The output signal of attenuator $R_1R_2$ is used to detect negative surges, and the output signal of attenuator $R_3R_4$ is used to detect positive surges. Clamp $D_1D_2$ clamps negative surges to one forward diode voltage (about 0.7 V) below the voltage at common terminal 191. Thus, the voltage at node $R_1R_2D_1D_2$ equals the supply voltage at supply power input terminal(s) 190B when there is no negative surge, and about 0.7 V below the voltage at common terminal 191 when there is a negative surge. Clamp D33D4 clamps positive surges to one forward diode voltage above the supply voltage at supply power input terminal(s) 190B. Thus the voltage at node R3R4D4D4 equals the voltage at common terminal 191 when there is no positive surge, and about 0.7 V above the supply voltage at supply power input terminal(s) 190B when there is a positive surge. Schmitt triggers ST1 and ST2 remove noise and create clean digital signals for logic 1540, which asserts its output when there is a negative surge or a positive surge.

Figure 16A:
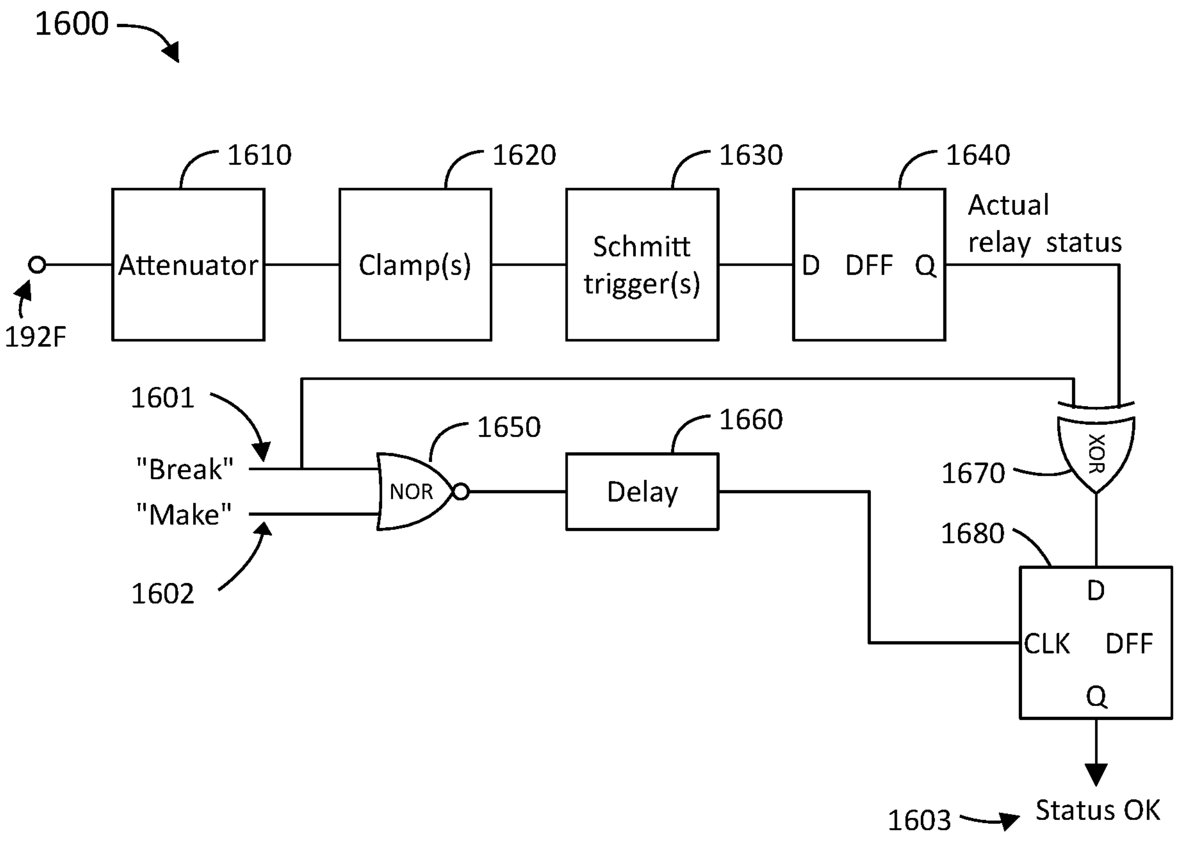
FIGS. 16A-B illustrate an example relay status detector.
Figure 16B:
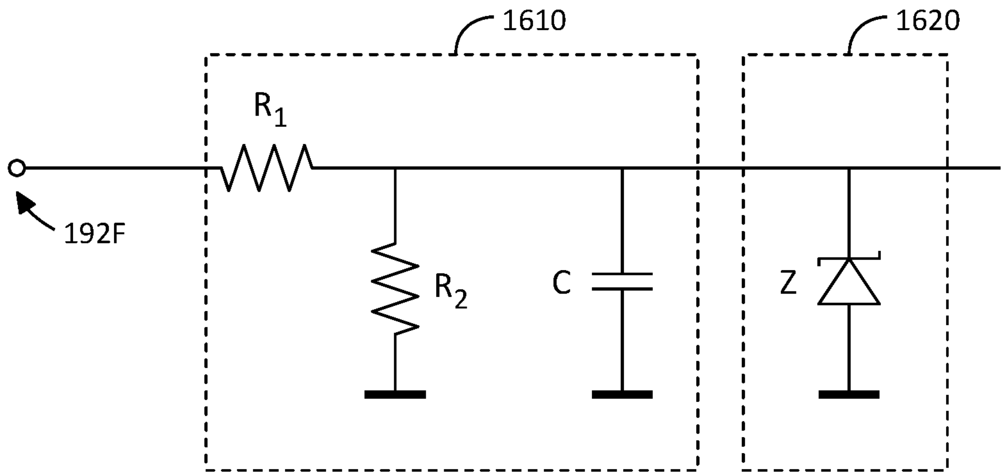

FIGS. 16A-B illustrate an example relay status detector 1600. This implementation functions for AC rail voltages. The relay status detector 1600 detects, after a relay status detection delay, whether the actual relay status does matches the desired relay status, and control logic 520 may be configured to take an action when the actual relay status does not match the desired relay status. The relay status detection delay is less than 60 milliseconds, and in some implementations less than 20 milliseconds. In some implementations, relay status detector 1600 drives an external LED that alerts a user to a relay fault state. Relay status detector 1600 includes attenuator 1610 (which may include a noise filter) to attenuate mains voltage signals, clamp(s) 1620 to clamp attenuated mains voltage signals to values that are safe to handle for an IC, Schmitt trigger 1630 (or another comparator circuit) to convert the clamped signals to digital signals, flip-flop 1640, which may be clocked by a delayed zero crossing signal, and which outputs an actual latch status signal, logic circuit 1650 which may include a NOR function to obtain an undelayed trigger signal from break pulse 1601 and make pulse 1602, delay element 1660 which delays the undelayed trigger signal, logic circuit 1670 which may include an XOR function and which receives the actual latch status signal and (for example) the break pulse 1601 at two of its inputs and which may output a pulse signal that indicates whether the actual latch status matches a desired match status, and flip-flop 1680 which captures the output signal of logic circuit 1670 at a time determined by the output signal of delay element 1660. Flip-flop 1680 outputs a status OK signal 1603.

Attenuator 1610 receives its input signal from relay state sense input terminal(s) 192F, and attenuates the input signal as needed for safe and reliable operation of clamp(s) 1620. Clamp(s) 1620 may take the attenuated signal and make it further suitable for the IC circuit. Attenuator 1610 and clamp(s) 1620 may be implemented similar to the circuit in FIG. 9, including a resistor R, a capacitor C to suppress RF signals, and a Zener diode Z to clamp the signal to values suitable for further processing. Schmitt trigger 1630 performs an analog-to-digital conversion to create an output signal that indicates the actual relay status. Flip-flop 1640 freezes this signal, for example by being clocked by a delayed version of a zero-crossing signal. In some implementations, the output of flip-flop 1640 is asserted when relay contacts are open and deasserted when relay contacts are closed.

FIG. 16B shows example details of attenuator 1610 and clamp(s) 1620. Attenuator 1610 may include a voltage divider $R_1R_2$, and a capacitor C that suppresses radio-frequency noise. Clamp(s) 1620 may include a Zener diode Z that limits the voltage excursion to the value of its Zener voltage for positive halves of the AC cycle, and to minus a forward diode voltage (approximately −0.7 V) for negative halves of the AC cycle.

Other implementations of a relay status detector, for example for DC rail voltages, may determine the absolute voltage differential between input terminal(s) 192D and F, and compare the absolute voltage differential with a threshold voltage to determine if the voltage at the output of a latching relay matches the voltage at the input of the latching relay closely enough.

Further implementations of a relay status detector may include one or more timers to suppress the output status while the relay may be transitioning from one state to another.

FIGS. 17A-D illustrate timing diagrams for the second coil control output signal and the first coil control output signal in an implementation of the disclosed technology.

Figure 17A:
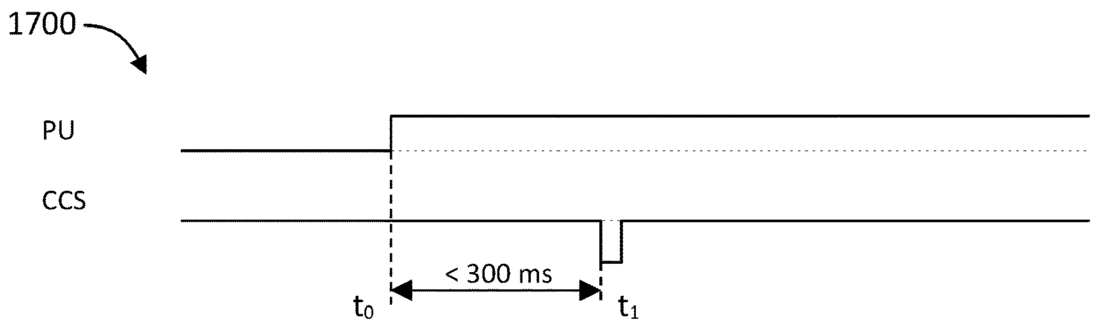
FIGS. 17A-D illustrate timing diagrams for the second coil control output signal and the first coil control output signal in an implementation of the disclosed technology.

FIG. 17A shows timing diagram 1700. Control logic 520 is configured to provide a second coil control output signal on the one or more coil control terminals (coil control terminal(s) 193C-E) within three hundred (300) milliseconds after receiving a power-up signal from the SPA detector 510H. The second coil control output signal resets series switch 130A when applied to the coil control terminals (C and D). In FIG. 1, coil control terminal(s) 193C-D provide a differential coil control signal (denoted as CCS in FIGS. 17A-D) to the coil control terminals C and D. The examples in FIGS. 17A-D assume that series switch 130A is a latching relay, which can be set by a positive pulse and reset by a negative pulse. The first control output signal resets the relay, and therefore goes negative.

FIG. 17A shows the signal PU (power up) that SPA detector 510H provides to control logic 520. At time $t_0$, SPA detector 510H asserts PU, indicating that load switching circuit 160 has sufficient supply voltage to operate. Within 300 ms, at time $t_1$, control logic 520 issues the second coil control output signal, i.e., a negative pulse. In load switching system 100, this allows for quickly switching off the power to the load when the system is plugged in. This safety feature helps shorten the time that dangerous input voltages (between first rail 110 and second rail 120) damage the load prior to the system's evaluation of the input voltages. In particular, a relay should be off when the power is off. But a latching relay could be in the on position due to mechanical forces while no power was available. Thus, load switching circuit 160 begins by quickly switching off series switch 130A on power up. In some implementations, load switching circuit 160 acts much quicker than in 300 ms, for example, within 10 ms. In general, the quicker the better. Additionally, relay driver 550 may provide the second coil control output signal (and the first coil control output signal) at a voltage more than ten percent (10%) above the operating voltage of the coil of the latching relay. The operating voltage is often specified as the voltage at which the coil may be continuously activated. Above the operating voltage, the coil could burn out. However, since load switching circuit 160 only applies a pulse to set or reset the latching relay, heating is a low risk even when the voltage of the pulse is significantly above the operating voltage. Using the higher voltage has the advantage of setting and resetting the latching relay within a shorter time, thereby, again, reducing the potential impact of dangerous conditions.

Figure 17B:
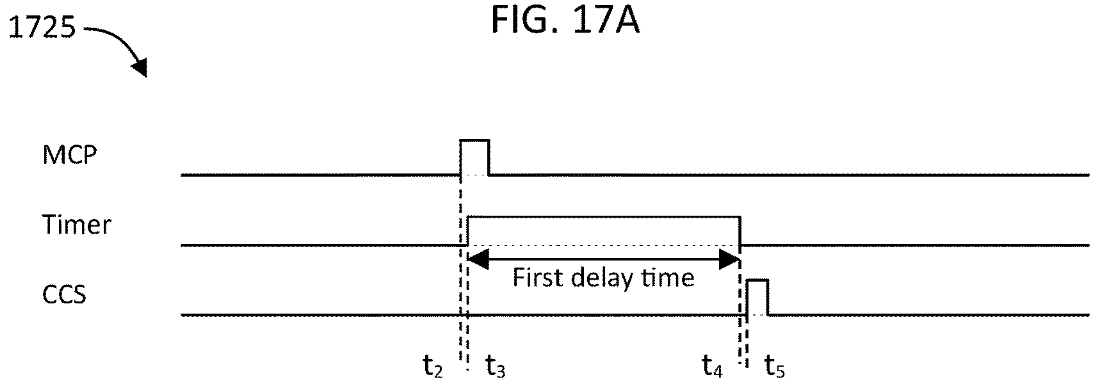

FIG. 17B shows timing diagram 1725 with a "make condition present" (MCP) signal that can be generated internal or external (from input terminal(s) 192G) to load switching circuit 160. Control logic 520 is configured to start make timer 530 upon receiving the "must make" signal and wait for the first delay time, then provide the first coil control output signal on coil control terminal(s) 193C-E. Upon receiving the "must make" signal (at time $t_2$), control logic 520 starts make timer 530 (at time $t_3$) and configures it to wait for the first delay time. The first delay time ends at $t_4$, and relay driver 550 provides the first coil control output signal (at $t_5$). The first coil control output signal sets series switch 130A, and load switching system 100 couples the load with the power lines.

Figure 17C:
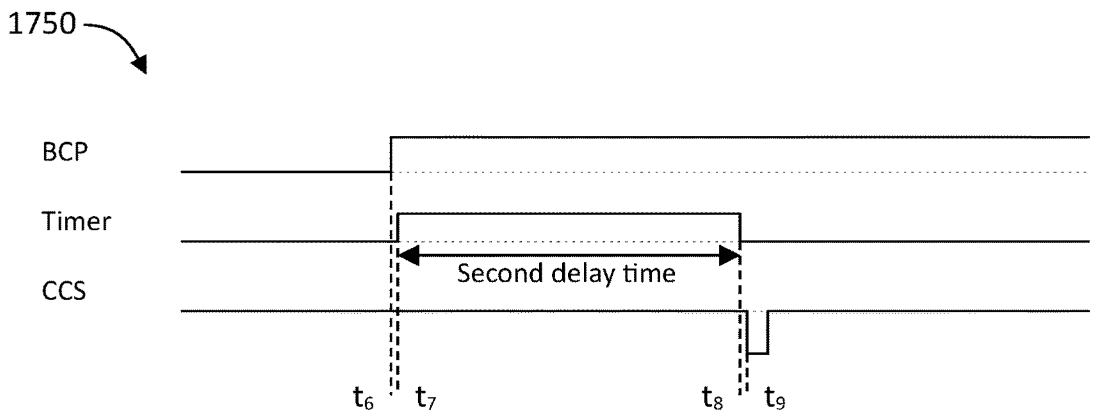

FIG. 17C shows Timing diagram 1750 with a "break condition present" (BCP) signal that for example swell detector 510B issues to control logic 520, based on a sensed condition. Load switching circuit 160 is configured to start make timer 530 upon receiving the "condition present" signal and wait for the second delay time, after which it provides the first coil control signal to the coil control terminals. When the condition is present, control logic 520 decouples the load from the power lines. Timing diagram 1750 shows the BCP signal, the timer and the CCS signal. When a detector 510 determines that the condition is present, it asserts the CP signal, which is shown to occur at $t_6$. Control logic 520 receives the BCP signal and starts break timer 540 (at $t_7$), configuring it to wait for the second delay time. After the second delay time (at $t_8$), relay driver 550 issues the second coil control output signal (a negative pulse at $t_9$). The first coil control signal resets the latching relay, decoupling the load from the power lines.

Figure 17D:
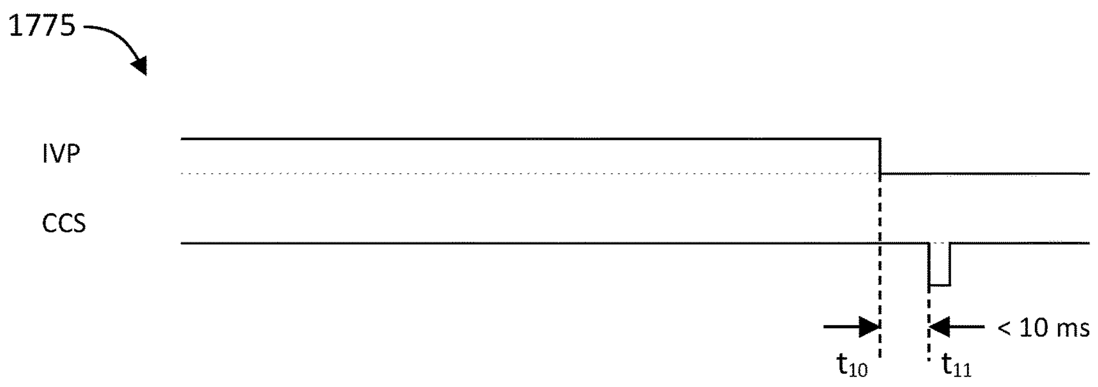

FIG. 17D shows timing diagram 1775 with the "input voltage present" (IVP) signal, issued by rail voltage detector 510A to control logic 520. Load switching circuit 160 is configured to provide the second coil control output signal on the coil control terminals within ten (10) milliseconds after receiving the signal from rail voltage detector 510A that the input voltage is no longer present. The second coil control output signal resets the latching relay, so that when no input voltage is present on the power lines, the load is decoupled from the power lines. The IVP signal is deasserted at time $t_{10}$, indicating that rail voltage detector 510A has detected a loss of power at the power lines. The system must quickly reset the latching relay before no more supply power is present to take this action. At time $t_{11}$, i.e., within 10 ms of detecting the loss of the input voltage, relay driver 550 issues the second coil control output signal.

Figure 18:
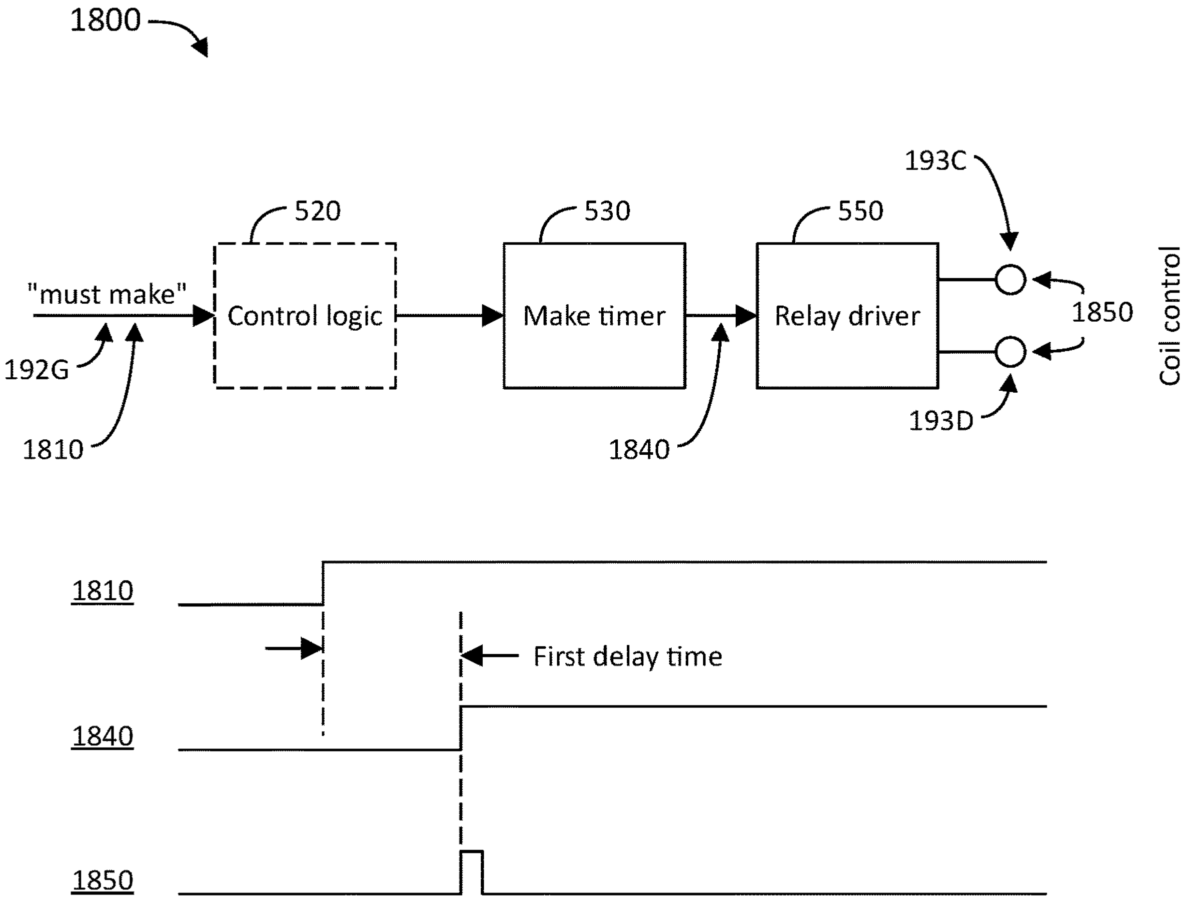
FIG. 18 illustrates an example of functionality related to coupling a load to the power rails.

FIG. 18 illustrates an example 1800 of functionality related to coupling a load to the power rails. In FIG. 5, the control logic 520 is configured to start make timer 530 upon receiving a "must make" signal and wait for a first delay time, then provide a first coil control output signal on the one or more coil control terminal(s) 193C-E. This process is depicted in FIG. 18, which shows control logic 520, make timer 530, relay driver 550, and coil control terminal(s) 193C-D. The "must make" signal 1810 may directly or indirectly (via control logic 520) enter make timer 530. Make timer 530 has an output coupled with an input of relay driver 550, whose coil control output (coil control terminal(s) 193C-D) can be coupled with a latching relay. A first delay time after "must make" signal 1810 triggers make timer 530, make timer 530 produces an output pulse. The timer output signal 1840 will be asserted the first delay time after make timer 530 is first triggered and will stay asserted until no further triggers are available. The timer output signal 1840 is also the input signal for relay driver 550, which responds by providing a first coil control output signal 1850 on the coil control terminals. In the context of FIG. 18 and while using a latching relay, the first coil control output signal 1850 is a pulse shorter than three hundred (300) milliseconds.

Figure 19:
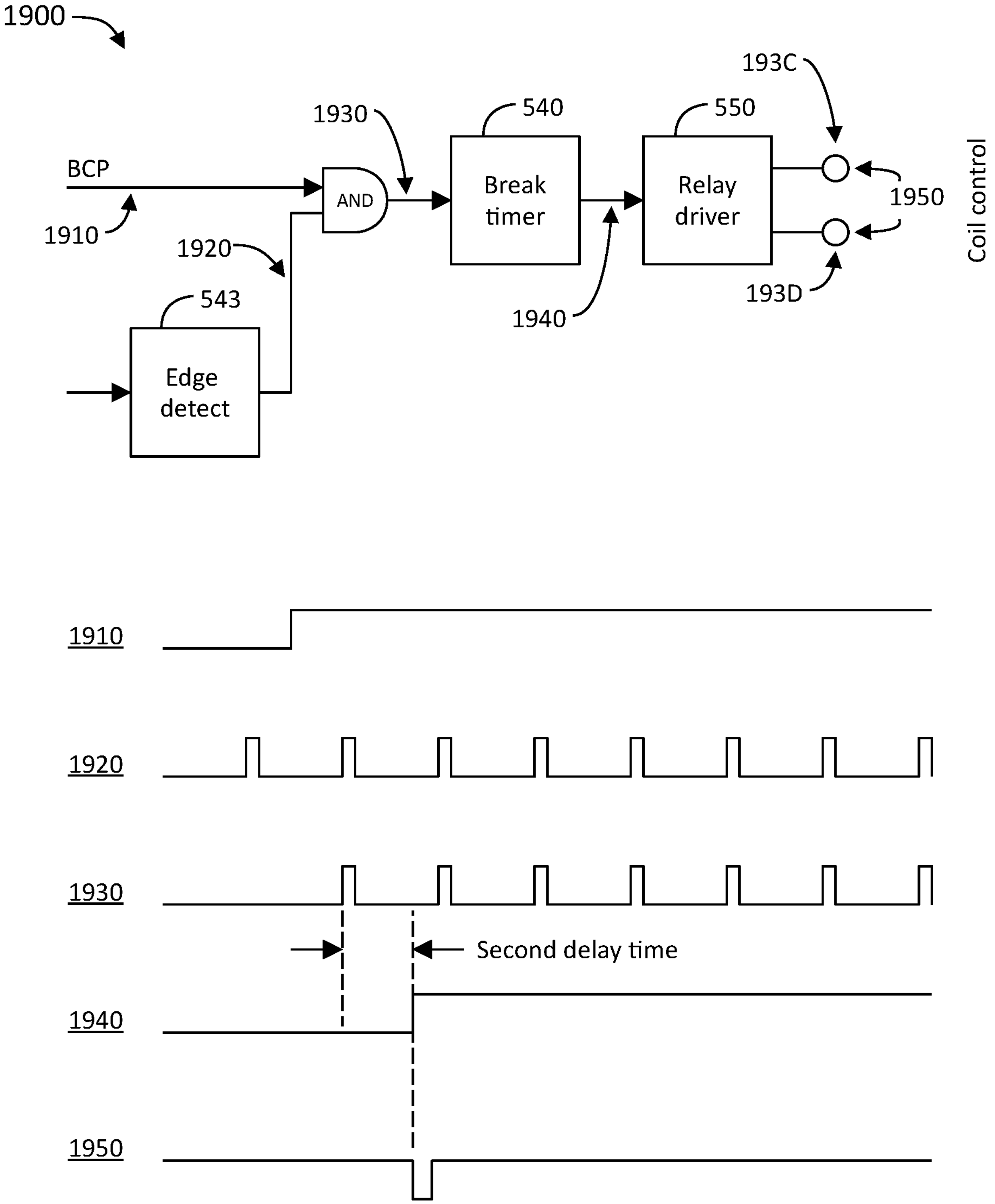
FIG. 19 illustrates an example of functionality related to decoupling a load from the power rails.

FIG. 19 illustrates an example 1900 of functionality related to decoupling a load from the power rails. In FIG. 5, control logic 520 starts the timer upon receiving a "break condition present" (BCP) signal from the condition detection circuit to wait for a second delay time, then provide the second coil control output signal on the one or more coil control terminals. This process is depicted in FIG. 19, which shows edge detection circuit 543, relay driver 550, detector 510, coil control terminal(s) 193, and shunt switch control terminal 194. In some implementations, the BCP signal 1910 directly enters break timer 540. In other implementations, as depicted, BCP signal 1910 enters a logic circuit, for example an AND gate. In those implementations, edge detection circuit 543 (from rail voltage detector 510A) is also coupled with the logic circuit, providing pulses that indicate zero crossings of an AC input signal (on the power lines). The logic circuit has an output coupled with the input of break timer 540. Break timer 540 has an output coupled with an input of relay driver 550, whose coil control output (coil control terminal(s) 193C-D) can be coupled with a latching relay. The zero crossing pulses signal 1920 at the output of edge detection circuit 543 is combined with BCP signal 1910 in the logic circuit to produce timer input signal 1930. A second delay time after timer input signal 1930 triggers break timer 540, break timer 540 produces an output pulse. If its duration is longer than the interval time of pulses in zero crossing pulses signal 1920 or timer input signal 1930, then timer output signal 1940 will be asserted the first delay time after break timer 540 is first triggered, and will stay asserted until no further triggers are available. The timer output signal 1940 is also the input signal for relay driver 550, which responds by providing a second coil control output signal 1950 on the coil control terminals. In the context of FIG. 19 and while using a latching relay, the second coil control output signal 1950 is a pulse shorter than two hundred (200) milliseconds.

Figure 20:
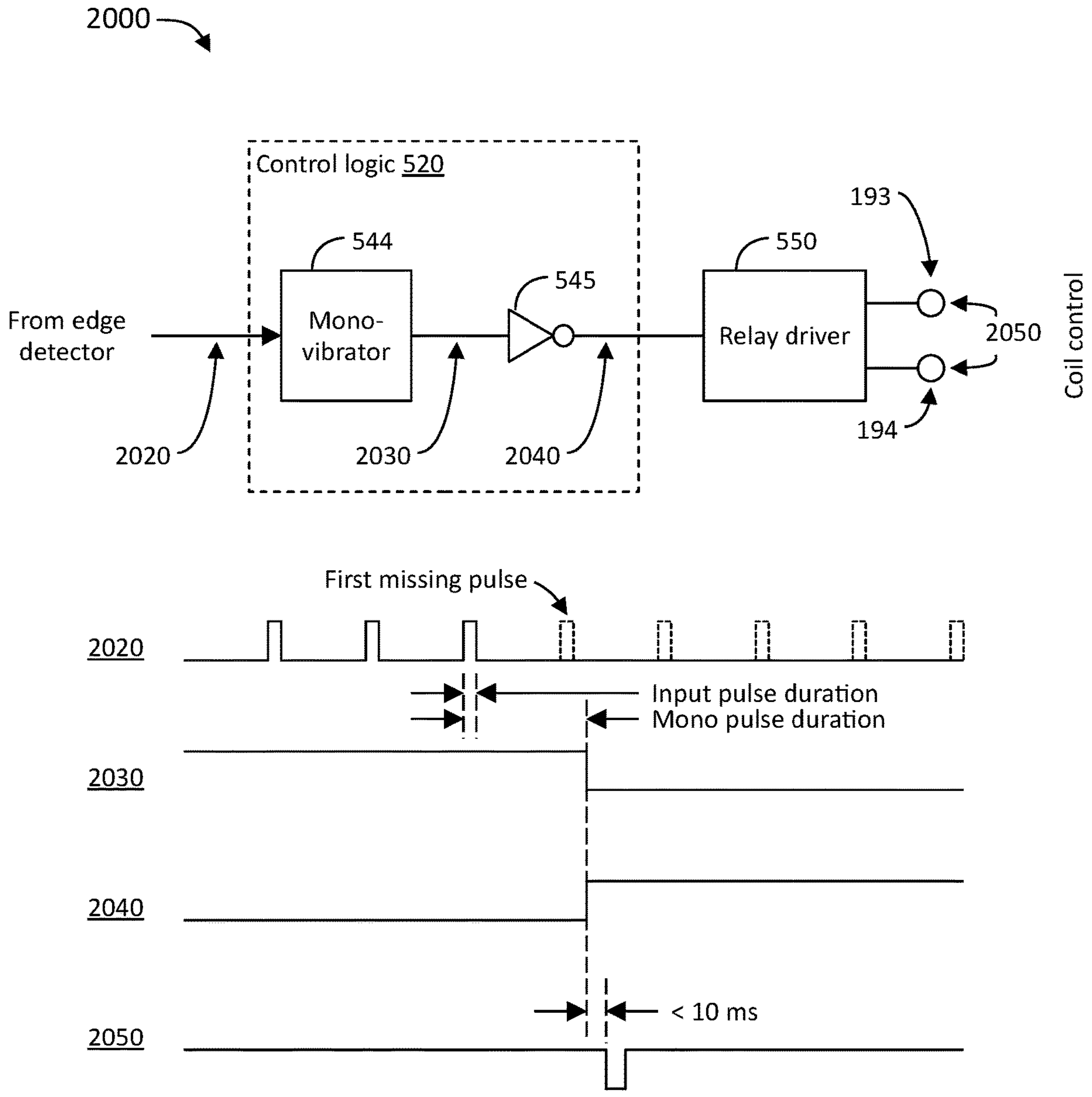
FIG. 20 illustrates an example of functionality related to decoupling a load from the power lines when an AC input voltage is interrupted.

FIG. 20 illustrates an example 2000 of functionality related to decoupling a load from the power lines when an AC input voltage is interrupted. In FIG. 5, the controller is configured to provide the second coil control output signal on the one or more coil control terminals within ten (10) milliseconds after receiving a signal ("rail fail") from the rail voltage detection circuit indicating a lack of presence of the input voltage. In this example, control logic 520 may include monostable multivibrator 544, as well as inverter 545 (or another logic circuit that inverts). The output of inverter 545 is coupled with an input of relay driver 550. The edge detector has an input pulse duration which is short relative to half the cycle time of the AC input voltage. Monostable multivibrator 544 has a mono pulse duration which is longer than half the cycle time of the AC input voltage. For example, it may be between half the cycle time and the full cycle time of the AC input voltage. The edge detector outputs the input signal 2020, which continues as a pulse train as long as the AC input voltage is available (because it is derived from the zero crossings in the AC input voltage). When the AC input voltage is no longer available, the pulses discontinue, and the pulse train stops. Monostable multivibrator 544 outputs a continuous asserted signal 2030 as long as the pulses in its input signal continue, because they arrive with a cycle time that is shorter than the mono pulse duration. When the pulses discontinue, monostable multivibrator 544 is no longer triggered, and its output will be de-asserted one mono pulse duration after the active flank of the final pulse in input signal 2020. Inverter 545 inverts signal 2030 to provide controller input signal 2040 (the "rail fail" signal). Detector 510 responds to the active flank of controller input signal 2040 by outputting, within 10 milliseconds, a second coil control output signal 2050 to the coil control output (coil control terminal(s) 193 and shunt switch control terminal 194). The second coil control output signal 2050 can be used to reset a latching relay, and thus placing a load switching system in a safe state while no AC input voltage is available.

Considerations

Although the description has been described with respect to particular implementations thereof, these particular implementations are merely illustrative, and not restrictive. The description may reference specific structural implementations and methods, and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented on a printed circuit board (PCB) using off-the-shelf devices, in a System-on-Chip (SoC), application-specific integrated circuit (ASIC), programmable processor, a coarse-grained reconfigurable architecture (CGRA), or in a programmable logic device such as a field-programmable gate array (FPGA), obviating the need for at least part of any dedicated hardware. Implementations may be as a single chip, or as a multi-chip module (MCM) packaging multiple semiconductor dies in a single package. All such variations and modifications are to be considered within the ambit of the disclosed technology the nature of which is to be determined from the foregoing description.

Any suitable technology for manufacturing electronic devices can be used to implement the circuits of particular implementations, including CMOS, FinFET, GAAFET, BICMOS, bipolar, JFET, MOS, NMOS, PMOS, HBT, MESFET, etc. Different semiconductor materials can be employed, such as silicon, germanium, SiGe, GaAs, InP, GaN, SiC, graphene, etc. Circuits may have single-ended or differential inputs, and single-ended or differential outputs. Terminals to circuits may function as inputs, outputs, both, or be in a high-impedance state, or they may function to receive supply power, a ground reference, a reference voltage, a reference current, or other. Although the physical processing of signals may be presented in a specific order, this order may be changed in different particular implementations. In some particular implementations, multiple elements, devices, or circuits shown as sequential in this specification can be operating in parallel.

It will also be appreciated that one or more of the elements depicted in the drawings/figures can also be implemented in a more separated or integrated manner, or even removed or rendered as inoperable in certain cases, as is useful in accordance with a particular application.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

The invention claimed is:

1. A load switching circuit, comprising:

a first supply power terminal and a common terminal;

a supply power availability detector (a SPA detector) coupled with the first supply power terminal and configured to detect availability of supply power at the first supply power terminal within sixty (60) milliseconds;

a rail voltage detector with a rail voltage detector input terminal;

a swell detector with a swell detector input terminal;

a surge detector with a surge detector input terminal;

control logic with inputs coupled with the SPA detector, the rail voltage detector, the swell detector, and the surge detector;

a make timer with an input coupled with the control logic;

a break timer with an input coupled with the control logic;

a relay driver with an input coupled with the make timer and an input coupled with the break timer;

a shunt switch control terminal coupled with the control logic; and one or more coil control terminals coupled with the relay driver;

wherein the control logic is configured to:

cause the relay driver to provide a second coil control output signal on the one or more coil control terminals within three hundred (300) milliseconds after receiving a power-up signal from the SPA detector;

start the make timer upon receiving a "rail voltage present" signal and wait for a first delay time, then cause the relay driver to provide a first coil control output signal on the one or more coil control terminals;

start the break timer upon receiving a "swell detected" signal from the swell detector to wait for a second delay time, then cause the relay driver to provide the second coil control output signal on the one or more coil control terminals;

provide a shunt switch control signal on the shunt switch control terminal upon receiving a "surge detected" signal from the surge detector; and provide the second coil control output signal on the one or more coil control terminals within ten (10) milliseconds after receiving a "rail fail" signal from the rail voltage detector.

2. The load switching circuit of claim 1, wherein the control logic is configured to cause the relay driver to provide the second coil control output signal on the one or more coil control terminals within five (5) milliseconds after receiving the power-up signal from the SPA detector.

3. The load switching circuit of claim 1, wherein:

the first coil control output signal is a pulse shorter than three hundred (300) milliseconds; and the second coil control output signal is a pulse shorter than two hundred (200) milliseconds.

4. The load switching circuit of claim 1, wherein:

the make timer and the break timer are combined in a single timer with configurable and/or selectable delay time.

5. The load switching circuit of claim 1, wherein the SPA detector includes a power-up detector and/or a power-down detector.

6. The load switching circuit of claim 1, further comprising:

an overcurrent detector coupled with one or more current sense input terminals and coupled with an input of the control logic; and a must make input terminal coupled with an input of the control logic;

wherein the control logic is configured to:

cause the relay driver to provide the second coil control output signal on the one or more coil control terminals upon receiving an "overcurrent detected" signal from the overcurrent detector; and start the make timer upon receiving a "must make" signal and wait for the first delay time, then cause the relay driver to provide a first coil control output signal on the one or more coil control terminals.

7. The load switching circuit of claim 1, further comprising:

a temperature sense circuit coupled with a temperature sense input terminal and coupled with an input of the control logic, wherein the control logic is configured to start the break timer to wait for the second delay time when a sensed temperature is too high, then cause the relay driver to provide the second coil control output signal on the one or more coil control terminals.

8. The load switching circuit of claim 1, further comprising:

a temperature sense circuit coupled with a temperature sense input terminal and coupled with an input of the control logic, wherein the control logic is configured to modify the first delay time and/or the second delay time as a function of a sensed temperature.

9. The load switching circuit of claim 1, further comprising:

a relay driver power terminal coupled with the relay driver and with the SPA detector and configured to provide an output voltage for the one or more coil control terminals.

10. The load switching circuit of claim 1, wherein a condition detection circuit includes a first comparator to detect if a sensed signal exceeds a first threshold.

11. The load switching circuit of claim 10, wherein the condition detection circuit includes a second comparator to detect if the sensed signal does not reach a second threshold.

12. The load switching circuit of claim 10, wherein the sensed signal includes at least one of an overvoltage, an undervoltage, an overcurrent, a temperature, a humidity, a pressure, or a frequency.

13. The load switching circuit of claim 1, further comprising:

a relay status detector coupled with a relay status input terminal configured to detect, after a relay status detection delay, whether an actual relay status matches a desired relay status, wherein the relay status detection delay is less than sixty (60) milliseconds.

14. The load switching circuit of claim 1, wherein the rail voltage detector determines a presence of zero crossings.

15. The load switching circuit of claim 1, wherein the rail voltage detector comprises a comparator, an edge detector coupled with an output of the comparator, and a monostable multivibrator coupled with an output of the edge detector.

16. The load switching circuit of claim 1, wherein the rail voltage detector comprises:

a clamping circuit;

an edge detection circuit with an input coupled with an output of the clamping circuit: wherein:

the edge detection circuit is configured to determine a timing of a zero crossing; and the control logic is configured to wait for a signal from the edge detection circuit upon receiving a "make condition present" signal before starting the make timer to wait for the first delay time.

17. A load switching system, comprising:

power lines including a first rail and a second rail;

a relay with relay contacts in series with the first rail, and with two or more relay control terminals;

a first load terminal coupled with a relay contact and a second load terminal coupled with the second rail;

a shunt switch coupled between the first load terminal and the second load terminal;

a power supply circuit coupled between the first rail and the second rail, with a supply power output; and a load switching circuit coupled with the power lines, the relay, the shunt switch, and the power supply circuit;

wherein the load switching circuit is configured to:

detect availability of supply power from the power supply circuit;

cause the relay to release within three hundred (300) milliseconds after detecting the availability of the supply power;

detect a presence of a rail voltage;

upon detecting the presence of the rail voltage, wait for a first delay time, then cause the relay to operate;

detect a presence of a swell;

upon detecting the presence of the swell, wait for a second delay time, then cause the relay to release;

detect a presence of a surge; and upon detecting the presence of the surge, cause the shunt switch to conduct.

18. The load switching system of claim 17, wherein the load switching circuit is further configured to:

detect an overcurrent condition; and within 10 milliseconds (10 ms) upon detecting the overcurrent condition, cause the relay to release and cause the shunt switch to conduct.

19. The load switching system of claim 17, wherein the load switching circuit is further configured to:

receive a temperature sense input signal from a temperature sensor;

determine if a sensed temperature exceeds a temperature threshold; and upon determining that the sensed temperature exceeds the temperature threshold, cause the relay to release.

20. The load switching system of claim 19, wherein the load switching circuit is further configured to:

change the first delay time and/or the second delay time as a function of a sensed temperature.

21. The load switching system of claim 19, wherein the temperature sensor includes at least one of a semiconductor-based sensor, a temperature-dependent resistor, a thermocouple, a thermistor, or an infrared-light-based sensor.

22. The load switching system of claim 19, wherein the sensed temperature is representative for a relay coil temperature.

23. The load switching system of claim 17, wherein the load switching circuit is further configured to:

determine an actual relay status; and take an action if the actual relay status does not match a desired relay status.

24. The load switching system of claim 17, wherein a relay coil control voltage is more than ten percent (10%) above an operating voltage of a relay coil.

* * * * *